US011027405B2

(12) United States Patent
Zhang et al.

(10) Patent No.: US 11,027,405 B2
(45) Date of Patent: Jun. 8, 2021

(54) POWER TOOL

(71) Applicant: Positec Power Tools (Suzhou) Co., Ltd., Jiangsu (CN)

(72) Inventors: Shisong Zhang, Jiangsu (CN); Xiaoli Pang, Jiangsu (CN); Hongfeng Zhong, Jiangsu (CN); Yu Wu, Jiangsu (CN); Weifeng Li, Jiangsu (CN); Xiao Zhao, Jiangsu (CN); Zhongya Zhou, Jiangsu (CN); Hongbing Wu, Jiangsu (CN); Haiquan Wu, Jiangsu (CN); Yinhang Bian, Jiangsu (CN); Hui Lu, Jiangsu (CN); Hui Li, Jiangsu (CN); Wei Zhang, Jiangsu (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 99 days.

(21) Appl. No.: 16/205,284

(22) Filed: Nov. 30, 2018

(65) Prior Publication Data

US 2019/0099873 A1 Apr. 4, 2019

Related U.S. Application Data

(63) Continuation-in-part of application No. PCT/CN2018/115725, filed on Nov. 15, 2018, and a
(Continued)

(30) Foreign Application Priority Data

May 31, 2016 (CN) .......................... 201620519284.X
Nov. 15, 2017 (CN) .......................... 201721525916.4
Feb. 13, 2018 (CN) .......................... 201820258149.3

(51) Int. Cl.
*B25F 5/02* (2006.01)
*B25F 5/00* (2006.01)
(Continued)

(52) U.S. Cl.
CPC .............. *B25F 5/006* (2013.01); *B25F 5/008* (2013.01); *H02K 1/185* (2013.01); *H02K 5/143* (2013.01);
(Continued)

(58) Field of Classification Search
CPC .......... B25F 5/006; B27B 19/006; H02K 7/04
See application file for complete search history.

(56) References Cited

U.S. PATENT DOCUMENTS 6,926,595 B2 * 8/2005 Pollak ..................... B24B 23/04
451/270
8,558,420 B2 * 10/2013 Du ......................... H02K 1/148
310/50
(Continued)

FOREIGN PATENT DOCUMENTS

CN 201821205 U 5/2011
CN 102149515 8/2011
(Continued)

OTHER PUBLICATIONS

State Intellectual Property Office of the P.R. China, International Search Report and Written Opinion for PCT/US2018/115725; 10 pages; dated Feb. 14, 2019.
(Continued)

*Primary Examiner* — Andrew M Tecco
*Assistant Examiner* — Eyamindae C Jallow
(74) *Attorney, Agent, or Firm* — Middleton Reutlinger

(57) ABSTRACT

An oscillating power tool, including: a housing; an output shaft for installing a working head, the output shaft being installed in the housing and extending out of the housing; a transmission mechanism, installed in the housing, and the transmission mechanism being connected to the output shaft; and a motor, installed in the housing, the motor being connected to the transmission mechanism and driving the
(Continued)

transmission mechanism to drive the output shaft to move, where an outer diameter of the motor is in a range of 40 mm to 50 mm.

15 Claims, 15 Drawing Sheets

Related U.S. Application Data continuation-in-part of application No. PCT/CN2017/086727, filed on May 31, 2017.

(51) Int. Cl.

| | | |
|---|---|---|
| *H02K 7/14* | (2006.01) | |
| *H02K 7/06* | (2006.01) | |
| *H02K 5/20* | (2006.01) | |
| *H02K 23/08* | (2006.01) | |
| *H02K 9/06* | (2006.01) | |
| *H02K 5/14* | (2006.01) | |
| *H02K 1/18* | (2006.01) | |
| *H02K 5/16* | (2006.01) | |
| *H02K 7/00* | (2006.01) | |
| *H02K 9/04* | (2006.01) | |
| *B25F 3/00* | (2006.01) | |
| *B24B 23/04* | (2006.01) | |
| *B24B 47/12* | (2006.01) | |

(52) U.S. Cl.
CPC ............... *H02K 5/161* (2013.01); *H02K 5/20* (2013.01); *H02K 7/06* (2013.01); *H02K 7/145* (2013.01); *H02K 9/06* (2013.01); *H02K 23/08* (2013.01); *B24B 23/04* (2013.01); *B24B 47/12* (2013.01); *B25F 3/00* (2013.01); *H02K 7/003* (2013.01); *H02K 9/04* (2013.01)

(56) References Cited

U.S. PATENT DOCUMENTS

| | | | |
|---|---|---|---|
| 9,555,554 B2 * | 1/2017 | Thorson | B23B 31/4073 |
| 2006/0060366 A1 * | 3/2006 | Bodine | B23B 45/02 173/213 |
| 2011/0067894 A1 * | 3/2011 | Bernardi | B25F 5/006 173/1 |
| 2012/0067607 A1 * | 3/2012 | Weber | B24B 47/16 173/216 |
| 2013/0167691 A1 * | 7/2013 | Ullrich | B25B 23/0064 81/57.11 |
| 2013/0181414 A1 * | 7/2013 | Haman | B27B 19/006 279/144 |
| 2014/0125158 A1 * | 5/2014 | Hessenberger | H02K 1/276 310/50 |
| 2014/0131059 A1 * | 5/2014 | Verbrugge | B25F 5/02 173/217 |
| 2014/0318286 A1 * | 10/2014 | Seebauer | B27B 19/006 74/55 |
| 2014/0319938 A1 * | 10/2014 | Weller | H02K 7/04 310/50 |
| 2015/0135541 A1 * | 5/2015 | Wierzchon | B25F 5/006 30/276 |
| 2015/0328742 A1 * | 11/2015 | Schuele | B24B 23/028 451/359 |
| 2017/0136599 A1 * | 5/2017 | Aoki | B24B 23/04 |

FOREIGN PATENT DOCUMENTS

| | | |
|---|---|---|
| CN | 201931450 U | 8/2011 |
| CN | 201975875 U | 9/2011 |
| CN | 103372856 A | 10/2013 |
| CN | 104853879 | 8/2015 |
| CN | 105305721 | 2/2016 |
| CN | 205342073 | 6/2016 |
| CN | 106160390 | 11/2016 |
| DE | 4211316 A1 | 10/1993 |

OTHER PUBLICATIONS

State Intellectual Property Office of the P.R. China, International Search Report and Written Opinion (English translation included) for PCT/US2017/086727 dated Jul. 6, 2017, 10 pages.

\* cited by examiner

POWER TOOL

BACKGROUND

Technical Field

The present invention relates to the technical field of power tools, and in particular, to an oscillating power tool.

The present invention relates to a motor applied to a handheld electric tool, and a handheld electric tool using the motor.

Related Art

An electric tool is a working tool in which a motor drives a working head to move, to implement work, such as cutting, drilling, and grinding, on a workpiece. Handheld electric tools, such as an angle grinder, an oscillating power tool, an electric circular saw, require a user to hold the tool with a hand to perform operation. An optimal working status of such handheld electric tools is that a user can grip a casing of the tool with a single hand, and the other hand may be used to assist control or adjustment on a moving direction, a force, an angle, and the like of the working head.

In a handheld alternating current electric tool such as an angle grinder, an oscillating power tool or an electric circular saw, a motor is usually mounted in the middle of an overall casing. During use, a user usually also grips a position in the middle of the casing. This is beneficial to balance control in an operation process. A weight or a size of the motor is directly related to a volume of the casing, and affects grabbing experience of the user when the user uses the electric tool.

There are also handheld direct current electric tools in the market. Their motors are not mounted at a gripped position, which requires rearrangement of weight of the tools, so that main weight sources of the electric tools are disposed on front and rear ends of a gripping portion during operation. This is beneficial to operation balance control on the electric tool and saves labor during operation.

For handheld alternating current electric tools, to satisfy working condition requirements, high-power motors need to be selected, correspondingly, sizes of the high-power motors are increased, and correspondingly, sizes of casing portions for accommodating the motors are increased, resulting in higher difficulty in gripping by a user. Consequently, it is likely to cause unstable gripping and operation fatigue. If a low-power motor is selected, although a volume of the motor is smaller, and a size of a casing accommodating the motor can be reduced, power of the electric tool is also reduced and cannot satisfy a requirement of a user for a working condition. Not only a high-power working condition requirement needs to be satisfied, but also suitability to a gripping operation is needed. This is a contradiction that bothers a person skilled in the art for a long time.

Currently, in the market, there are handheld electric tools using a brushless motor. Because of using electronic commutation, the brushless motor has no brush holder, and its volume is usually smaller than that of a brush motor. However, manufacturing costs of a brushless motor is greatly higher than those of a brush motor. In particular, maintenance costs of an electronic commutator are very high because of its failure rate. Therefore, either maintenance costs or replacement costs of a brushless motor are obviously higher than those of a brush motor.

In the prior art, a common integral motor is also replaced with a split stator motor. A so-called split motor means that a stator thereof is split into a plurality of pieces before winding, each piece is independently wound to increase a winding capacity, and after the winding is completed, the pieces are spliced or welded into one piece. In a conventional process, a split stator has more coils wound compared with an integral stator, so that power of a motor can be increased. However, compared with an integral stator, a split stator has more complex manufacturing and assembly processes and much higher manufacturing costs, and is not suitable for being widely used in electric tool products.

In addition, settings on thickness of a wall of a casing of an electric tool and a gap between the casing and a motor may affect the gripped casing to some extent. However, a material of a common casing is ordinary plastic. If the thickness of the wall is reduced, strength of the casing is significantly reduced, so that working stability of the electric tool is greatly reduced. If the casing is selectively made from a metal material, an overall weight is significantly increased, and a gripping sense and operability for a user are reduced. If the gap between the casing and the motor, a heat dissipation space surrounding the motor is reduced, and this is disadvantageous in terms of heat dissipation of the motor and the casing.

It is found by researches that a suitable casing size, particularly, a suitable casing perimeter, makes it more comfortable for a user to grip without easily getting tired, provides a stronger gripping sense, makes it easy to adjust a working head, and makes it difficult for the electric tool to slip out of the hand. Because of different racial characteristics, the palms of those native to East Asia are smaller than those of natives of Western Europe and America. Upon measurement, in China, palms of males have a length generally ranging from 175 mm to 200 mm and a width ranging from 80 mm to 90 mm, and palms of females have a length generally ranging from 150 mm to 180 mm and a width ranging from 65 mm to 80 mm. To adapt to palm sizes of Chinese users or even Asian users, an optimal perimeter of a casing of a handheld electric tool for a user to grip ranges from 150 mm to 185 mm. Electric tool manufacturers are always dedicated to researching a handheld alternating current electric tool suitable for a user to grip and conforming to human-machine operation.

Therefore, researching how to improve power of an alternating current motor and power of a handheld electric tool using the alternating current motor while keeping the volume of the motor unchanged, so that not only the handheld motor tool can satisfy working condition requirements, but also a casing portion accommodating the motor is suitable for a user to grip, is a problem the inventors have identified to solve.

The oscillation machine is a common handheld oscillating power tool in the industry, and its working principle is that an output shaft performs oscillating motion around an axis per se. When a user mounts different working heads such as a straight saw blade, a circular saw blade, a triangular disc sander, a shovel-shaped scraper on a free end of the output shaft, multiple different operation functions such as sawing, cutting, grinding, scraping, etc., can be realized, so as to adapt to different working requirements.

SUMMARY

Based on this, it is necessary to provide a brush motor that has an integral stator and that features low costs, high power, and a small volume.

The present embodiment is implemented by using the following technical solutions: A motor, applied to a handheld electric tool, includes: an integral stator; a rotor, disposed inside the stator; an armature shaft, fixedly connected to the rotor and connected to a commutator; and a brush, electrically connected to the commutator. An outer diameter of the stator is not greater than 58 mm, a ratio of an outer diameter of the rotor to the outer diameter of the stator ranges from 0.6 to 0.7, and a ratio of output power of the motor to a volume is greater than 8.5 W/cm$^3$.

In one of the embodiments, the outer diameter of the stator is not greater than 50 mm, and the ratio of the outer diameter of the rotor to the outer diameter of the stator ranges from 0.6 to 0.65.

In one of the embodiments, a yoke width of the stator ranges from 3.6 mm to 4.2 mm.

In one of the embodiments, a length of the stator along an axial direction of the armature shaft is not less than 40 mm.

In one of the embodiments, a diameter of the armature shaft is not less than 7.5 mm.

In one of the embodiments, the diameter of the armature shaft ranges from 7.5 mm to 9 mm.

The present embodiment increases the ratio of the outer diameter of the rotor to the outer diameter of the stator to be 0.6 or higher and a proportion of the output power of the motor to the volume to be 8.5 W/cm$^3$ or higher, thereby enhancing an output capability of the motor having a same size.

A motor, applied to a handheld electric tool, includes: a integral stator; a rotor, coaxially sleeved in the stator; an armature shaft, fixedly connected to the rotor; a commutator, fixedly connected to the armature shaft; and a brush, electrically connected to the commutator, where an outer diameter of the stator is not greater than 58 mm, a yoke width of the stator ranges from 3.5 mm to 4.2 mm, and a ratio of an outer diameter of the rotor to the outer diameter of the stator ranges from 0.618 to 0.65.

In one of the embodiments, the outer diameter of the stator is not greater than 55 mm, the yoke width of the stator ranges from 4.1 mm to 4.3 mm, and the ratio of the outer diameter of the rotor to the outer diameter of the stator ranges from 0.618 to 0.636.

In one of the embodiments, the outer diameter of the stator is 55 mm, the yoke width of the stator is 4.2 mm, and the ratio of the outer diameter of the rotor to the outer diameter of the stator is 0.636.

In one of the embodiments, the outer diameter of the stator is not greater than 50 mm, the yoke width of the stator ranges from 3.8 mm to 4.2 mm, and the ratio of the outer diameter of the rotor to the outer diameter of the stator ranges from 0.62 to 0.64.

In one of the embodiments, the outer diameter of the stator is 50 mm, the yoke width of the stator is 3.8 mm, and the ratio of the outer diameter of the rotor to the outer diameter of the stator is 0.62.

In one of the embodiments, the outer diameter of the stator is not greater than 46 mm, the yoke width of the stator ranges from 3.5 mm to 3.7 mm, and the ratio of the outer diameter of the rotor to the outer diameter of the stator ranges from 0.62 to 0.65.

In one of the embodiments, the outer diameter of the stator is 46 mm, the yoke width of the stator is 3.6 mm, and the ratio of the outer diameter of the rotor to the outer diameter of the stator is 0.62.

The present embodiment provides a handheld electric tool that is suitable for gripping and that is comfortably operable. The handheld electric tool has the foregoing integral motor and further includes: a casing; and a transmission mechanism, configured to transfer torque of the armature shaft to an output shaft. The casing has a gripping portion, an inner edge of the gripping portion at least holds the stator coaxially, a periphery of the gripping portion is used for gripping, a peripheral perimeter of the gripping portion ranges from 150 mm to 185 mm, and a ratio of output power of the motor to the peripheral perimeter of the gripping portion is greater than 5.1 W/mm.

In one of the embodiments, the peripheral perimeter of the gripping portion ranges from 165 mm to 182 mm, and the outer diameter of the stator is not greater than 50 mm.

In one of the embodiments, the ratio of the output power of the motor to the peripheral perimeter of the gripping portion is greater than 5.2 W/mm.

In one of the embodiments, the ratio of the output power of the motor to the peripheral perimeter of the gripping portion is greater than 5.35 W/mm.

In one of the embodiments, the peripheral perimeter of the gripping portion ranges from 165 mm to 170 mm, the outer diameter of the stator is not greater than 46 mm, and a length of the stator along an axial direction of the armature shaft is not less than 50 mm.

In one of the embodiments, the ratio of the output power of the motor to the peripheral perimeter of the gripping portion is greater than 5.15 W/mm.

In one of the embodiments, a diameter of the armature shaft is not less than 7.5 mm.

Preferably, the diameter of the armature shaft ranges from 7.5 mm to 9 mm.

In one of the embodiments, the casing includes a body and a head shell, where the body is fixedly connected to the head shell, the gripping portion is on the body, the body includes a heat dissipation portion, the gripping portion is located between the head shell and the heat dissipation portion, and a cross-sectional area of the gripping portion is smaller than a cross-sectional area of the heat dissipation portion.

In one of the embodiments, a material of the body is plastic that has been subject to a granulation process.

In one of the embodiments, the heat dissipation portion has an air inlet, and the air inlet extends along an axial direction of the heat dissipation portion from one end of the heat dissipation portion to the other end thereof.

In one of the embodiments, the head shell has an air outlet, and a proportion of an area of the air inlet to an area of the air outlet is not less than 1.

In one of the embodiments, the casing includes a connection portion, and the gripping portion is connected to the heat dissipation portion through the connection portion.

In one of the embodiments, the handheld electric tool further includes a component disposed on a tail end of the body, a tail cover sleeved over the tail end of the body, and a guide member located between the body and the tail cover, an air inlet is arranged on the tail cover, the guide member and the tail cover form an air inlet passage in a surrounding manner, the air inlet passage is in communication with the air inlet and the motor, cooling air that enters through the air inlet flows along the air inlet passage to the motor, and the component is located at a position outside the air inlet passage.

In one of the embodiments, the air inlet passage and the component are located on different sides of the guide member.

In one of the embodiments, the guide member is disposed on the body.

In one of the embodiments, the guide member and the body are integrally formed, or the guide member is fixedly connected to the casing.

In one of the embodiments, the guide member is disposed on the tail cover.

In one of the embodiments, the guide member is in a plate shape.

In one of the embodiments, the guide member is parallel to an axial direction of the motor.

In one of the embodiments, the guide member extends along an axial direction of the motor, and a cross section of the guide member perpendicular to the axial direction of the motor is a curved surface.

In one of the embodiments, the air inlet passage extends along an axial direction of the motor.

In one of the embodiments, the air inlet on the tail cover includes a first air inlet enabling cooling air to enter the air inlet passage along an axial direction of the motor, and a second air inlet enabling cooling air to enter the air inlet passage along a direction perpendicular to the axial direction of the motor.

Compared with the prior art, the present embodiment increases the proportion of the output power of the handheld electric tool to the gripping perimeter to 5.1 W/mm or higher, so that the output power can completely satisfy working requirements of the handheld tool while ensuring gripping comfort. This not only enables a user to use the handheld electric tool for a long time without getting tired, but also improves working efficiency. In addition, the cooling air that enters through the air inlet flows to the motor through the air inlet passage, and the component is located at a position outside the air inlet passage, so that the cooling air that enters through the air inlet no longer flows through the component. This avoids a situation in which the cooling air from is blocked by the component and forms a vortex, so that more of the cooling air that enters through the air inlet flows to the motor, thereby improving an amount of effective cooling air and cooling efficiency.

A handheld electric tool includes: a housing; an output shaft used for mounting a working head, where the output shaft is mounted inside the housing and extends out of the housing; a transmission mechanism, mounted inside the housing, where the transmission mechanism is connected to the output shaft; and a motor, mounted inside the housing, and including: a integral stator; a rotor, coaxially sleeved in the stator; and an armature shaft, fixedly connected to the rotor, where the armature shaft is connected to the transmission mechanism, and the transmission mechanism converts rotation of the armature shaft into reciprocation of the output shaft around its axis line, where an outer diameter of the motor ranges from 40 mm to 50 mm, a no-load rotation speed of the motor is greater than 20000 revolutions/minute, and a ratio of output power of the motor to a volume is greater than 2 W/cm$^3$.

In one of the embodiments, a gripping portion is disposed on the housing, and an outer perimeter of the gripping portion ranges from 150 mm to 200 mm.

In one of the embodiments, a ratio of the output power of the motor to a peripheral perimeter of the gripping portion is greater than 0.8 W/mm.

In one of the embodiments, the ratio of the output power of the motor to the peripheral perimeter of the gripping portion is greater than 0.95 W/mm.

In one of the embodiments, the no-load rotation speed of the motor is greater than 30000 revolutions/minute, and the ratio of the output power of the motor to the volume is greater than 5.5 W/cm$^3$.

In one of the embodiments, a gripping portion is disposed on the housing, an outer perimeter of the gripping portion ranges from 150 mm to 200 mm, and a ratio of the output power of the motor to the peripheral perimeter of the gripping portion is greater than 2.0 W/mm.

In one of the embodiments, a ratio of an outer diameter of the rotor to an outer diameter of the stator ranges from 0.60 to 0.70, and a yoke width of the stator ranges from 3.5 mm to 4.0 mm.

In one of the embodiments, the ratio of the outer diameter of the rotor to the outer diameter of the stator ranges from 0.65 to 0.70, and the yoke width of the stator ranges from 3.5 mm to 3.8 mm.

In one of the embodiments, an outer diameter of the stator is 46 mm, the yoke width is 3.6 mm, and a ratio of an outer diameter of the rotor to the outer diameter of the stator is 0.62.

In one of the embodiments, an axial length of the motor ranges from 45 mm to 60 mm.

BRIEF DESCRIPTION OF THE DRAWINGS

The foregoing objectives, technical solutions, and beneficial effects of the present embodiment can be described in detail by using the following specific embodiments that can implement the present embodiment, and can also be clearly obtained with reference to the accompanying drawings.

DETAILED DESCRIPTION

To make the objectives, technical solutions, and advantages of the present invention more comprehensible, the specific implementations of the present invention are described below in detail with reference to the accompanying drawings. Many specific details are described in the following description, to help sufficiently understand the present invention. However, the present invention can be implemented in many other manners different from those described herein. A person skilled in the art can make similar improvements without departing from the connotation of the present invention. Therefore, the present invention is not limited by the specific embodiments disclosed below.

Figure 1:
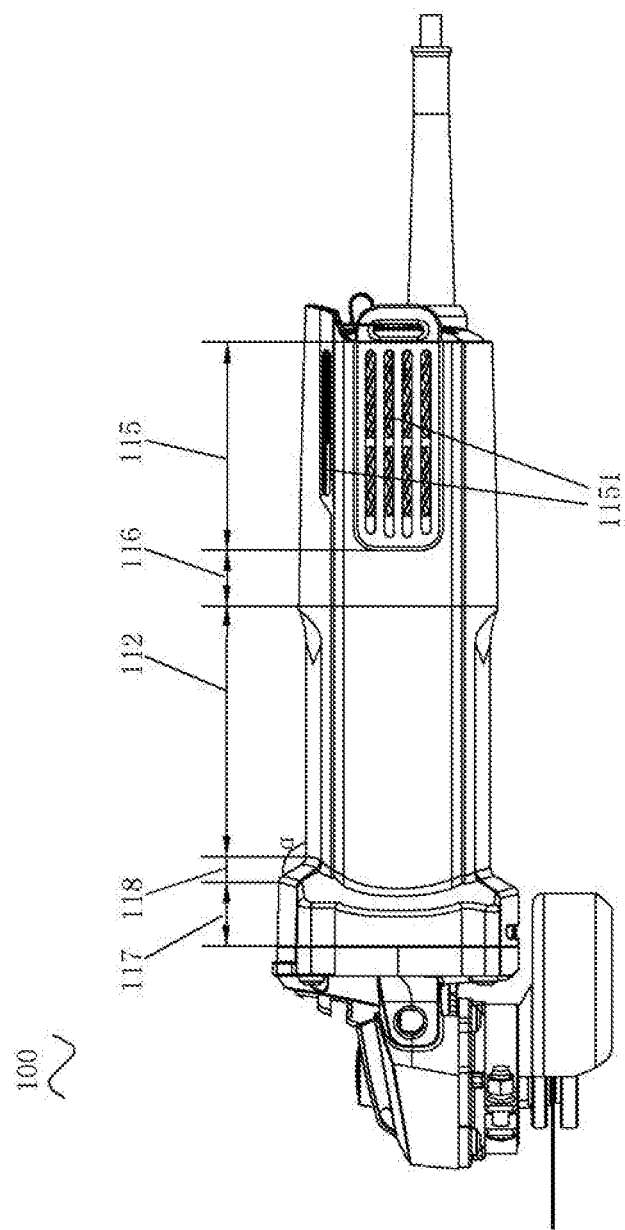
FIG. 1 is a schematic diagram of an angle grinder from a front direction.
Figure 2:
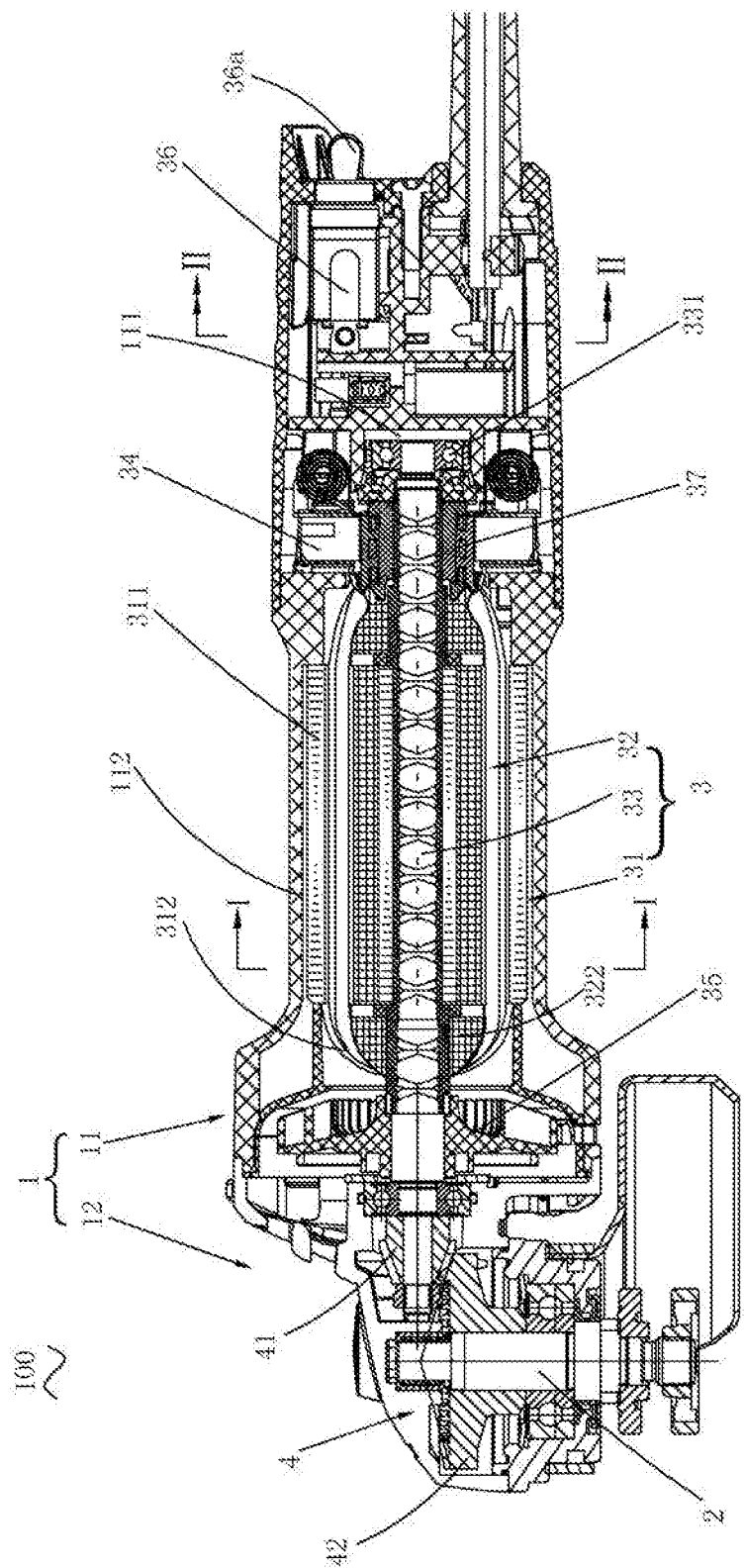
FIG. 2 is a cross-sectional view of an internal structure of an angle grinder.
Figure 3:
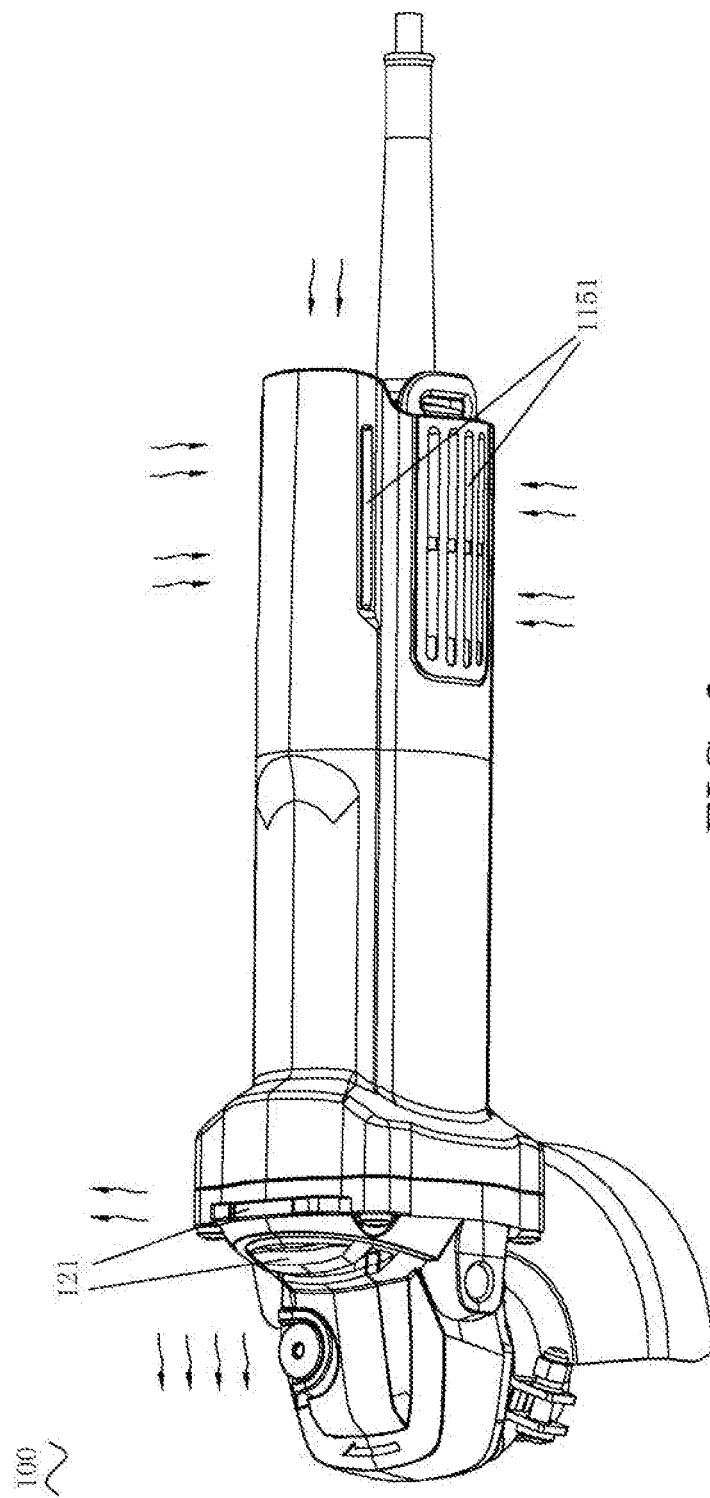
FIG. 3 is a schematic diagram of air ventilation of an angle grinder.

Referring to FIG. 1, FIG. 2, and FIG. 3, in a specific embodiment of the present embodiment, a handheld electric tool is an angle grinder 100. It can be understood that handheld electric tools having similar structures, such as an oscillating power tool, an electric circular saw, and a straight grinder, are variants of an angle grinder. Details are not described herein. The angle grinder 100 has a hollow casing 1. The casing 1 accommodates a motor 3 and a transmission mechanism 4, and an air flow passage configured for cooling. The casing 1 includes a body 11, a tail cover 150, and a head shell 12. The body 11 and the head shell 12 are fixedly connected together through screws, to ensure stability of a handheld angle grinder during working. The tail cover 150 is sleeved over a tail end of the body 11. The motor 3 is disposed inside the body 11, and the transmission mechanism 4 is disposed inside the head shell 12.

The motor 3 is a brush alternating current motor. In this embodiment, a single-phase series motor is used, in which a stator 31 includes a stator core 311 and an excitation winding 312, a rotor 32 includes a rotor core 321, an armature winding 322, a commutator 37, and an armature shaft 33. An insulated shaft or the like is usually disposed between the rotor core and the armature shaft. The excitation winding 312 and the armature winding 322 are connected in series to each other through a carbon brush 34 and the commutator 37.

A cooling fan 35, the motor 3, the carbon brush 34, a circuit board (not marked), and a switch 36 are sequentially accommodated inside the body 11 along an axial direction of the armature shaft 33. A trigger button 36a of the switch 36 extends out of the body 11 and is configured for convenient operation. The cooling fan 35 is disposed at a position of the body 11 near the head shell 12, and the carbon brush 34 is disposed on a brush holder connected to the body 11, and is electrically connected to the commutator 37 of the motor 3.

The stator 31 of this embodiment is an integral stator. Different from split stators in the prior art, each stack piece of the stator in an axial direction is a hollow integral one, and a plurality of stack pieces is welded together to form a hollow integral stator. The stator 31 is fixed inside the body 11, the rotor 32 and the armature shaft 33 that is driven by the rotor 32 to rotate are located on an inner side of the stator 31. On end of the armature shaft 33 proximal to the cooling fan 35 extends out of the body 11 to enter the head shell 12. The body 11 is approximately cylindrical, and extends along the axial direction of the armature shaft 33, and an extending axis line of the body 11 is coaxial to an axis line of the armature shaft 33.

The body 11 includes a first cylindrical portion 110 that is configured to accommodate the cooling fan 35 and that is connected to the head shell 12, a second cylindrical portion 112 connected to the first cylindrical portion 110, and a third cylindrical portion 130 in which electronic devices, such as the commutator 37, the circuit board, and the switch 36, are disposed. The second cylindrical portion 112 serves as a gripping portion and accommodates the stator 31 of the motor 3 and a part of the rotor 32 located on an inner side of the stator 31. A diameter of the second cylindrical portion 112 is less than diameters of the first cylindrical portion 110 and the third cylindrical portion 130. Such design is performed, so that the gripping portion gripped by a user during operation is a narrowest portion of the body 11, and the carbon brush 34 and the cooling fan 35 are respectively located on two sides of the gripping portion.

The cooling fan 35 is fixedly connected to an end of the armature shaft 33 proximal to the head shell 12, and generates negative pressure during rotation to suck in cooling air outside the casing 1 through an air inlet 1151 of the tail cover 150. The cooling air flows through the switch 36, the circuit board, the motor 3, and the cooling fan 35, and is discharged through an air outlet 121 of the head shell 12.

In this embodiment, because the diameter of the first cylindrical portion 110 is greater than the diameter of the second cylindrical portion 112 used as the gripping portion, a diameter of the cooling fan 35 disposed on the first cylindrical portion 110 may alternatively to be set to have a diameter greater than that of the stator 31, and a large amount of cooling air leads to a good cooling effect. In this implementation, the first cylindrical portion 110 includes an enlarged portion 117 and a transition portion 118 that is connected to the second cylindrical portion 112 and that is set to have an arc-shaped surface, and an angle α between the transition portion 118 and the gripping portion is close to 120°. Setting of the angle α enables a palm web of a user to come into close contact with the transition portion 118 during a grip operation of the user, so that the transition portion 118 provides stable support for the grip operation, thereby providing more comfortable operability. The enlarged portion 117 is configured to connect to the head shell 12 in a shape matching manner.

A person skilled in the art may alternatively conceive of setting the diameter of the cooling fan 35 to be equal to a diameter of the stator 31 and also setting a diameter of the first cylindrical portion 110 to be equal to a diameter of the gripping portion 112.

Figure 6:
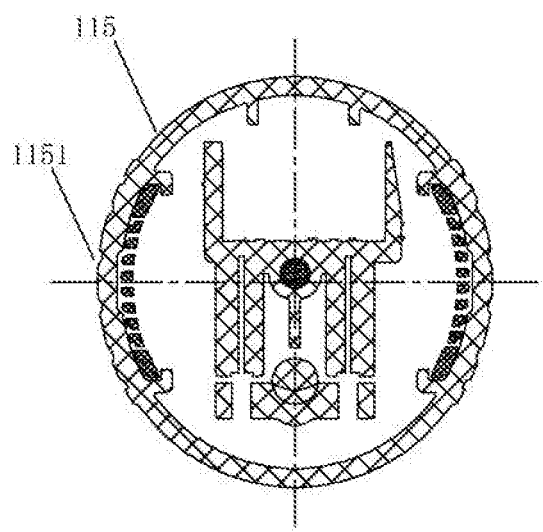
FIG. 6 is a cross-sectional view along a II-II direction in FIG. 2.

Further referring to FIG. 3 and FIG. 6, the third cylindrical portion 130 includes a connection portion 116 connected to the gripping portion, and a heat dissipation portion 115 connected to the connection portion. The heat dissipation portion 115 provides a passage for cooling air that enters into the body, to enable low-temperature air outside the casing to enter into the casing. The carbon brush 34 is disposed inside the connection portion 116, or is disposed partially inside the connection portion 116 and partially inside the heat dissipation portion 115, or is disposed inside the heat dissipation portion 115. The heat dissipation portion 115 is disposed on the body 11 is in communication with an air flow inside the gripping portion. An air flow inside the heat dissipation portion 115 may flow into the gripping portion to bring away heat generated by the motor 3. Thicknessses of housings of the gripping portion and the heat dissipation portion 115 are similar or the same, and a cross-sectional area of an inner edge of the gripping portion is less than a cross-sectional area of an inner edge of the heat dissipation portion 115. When an air flow flows from the heat dissipation portion 115 having a relatively large cross-sectional area into the gripping portion having a relatively small cross-sectional area, a flow rate of the air flow in the gripping portion is increased, thereby enhancing a head dissipation effect on the gripping portion and the motor 3. Cooling air enters through the air inlet 1151 of the heat dissipation portion 115, flows through a gap between the gripping portion and the motor 3 to bring away heat of the motor 3 and the gripping portion, and finally, flows out through the air outlet 121 of the head shell 12. The cooling air mainly performs heat dissipation for the motor 3 and the gripping portion, reduces temperatures of the motor 3 and the gripping portion, and prevents an over high internal temperature of the handheld angle grinder from affecting working and the service life of elements therein. When flowing through the head shell 12, the cooling air also performs heat dissipation for the head shell 12 and the transmission mechanism 4. The trail cover 150 is sleeved over the body 11, and the heat dissipation portion and the tail cover partially overlap.

Air inlets 1151 are respectively arranged on two sides of a housing of each of the heat dissipation portion 115 and the tail cover 150. The air inlet 1151 includes several empty slots (not marked) extending along an axial direction of the heat dissipation portion 115 and disposed along a radial direction in a spaced manner. The air inlets serve as a cooling passage and helps low-temperature air to enter into the casing. In this embodiment, the air inlet 1151 extends from one end of the heat dissipation portion 115 to the other end thereof. A pluggable dust-proof sheet 22 is disposed on an inner side of the housing of the tail cover 150. A dense grid that not only can allow an external air flow to enter, but also can prevent dust having a specified particle size from entering into the housing is disposed on the dust-proof sheet 22. Setting of the dust-proof sheet not only can facilitate cleaning and mounting, but also can effectively prevent dust from entering the air inlet 1151.

Figure 4:
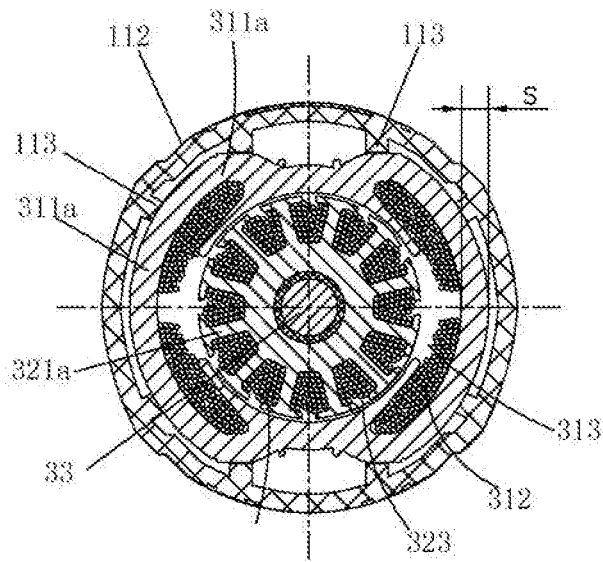
FIG. 4 is a cross-sectional view along a I-I direction in FIG. 2.

With reference to FIG. 4, the motor 3 is disposed inside the body 11. The stator 31 is in an interference fit with a fixing element 113 in the body 11, to ensure that there is no relative movement between the stator 31 and the body 11. The fixing element 113 and the inner edge of the gripping portion are integrally formed. The rotor 32 is disposed inside the stator 31, and two ends of the armature shaft 33 are respectively mounted in a first bearing 331 and a second bearing 332. The first bearing 331 is disposed inside a first bearing chamber 111 of the body 11, and the second bearing 332 is disposed inside a second bearing chamber 122 of the head shell 12.

On the body 11, a first mounting portion having a similar or same contour extends from the first cylindrical portion 110, the head shell 12 has a second mounting portion having a similar or same contour, and during assembly, the first mounting portion and the second mounting portion are coaxially connected together, and then, the body 11 and the head shell 12 are fixedly connected to each other through screws. Usually, during designing and production, the first mounting portion and the first bearing chamber 111 are coaxial, and the second mounting portion and the second bearing chamber 122 are also coaxial, to ensure that the first bearing chamber 111 and the second bearing chamber 122 keep coaxial.

To ensure that the body 11 has enough strength to prevent the first bearing chamber 111 and the fixing element 113 from generating a relatively large deformation and affecting coaxiality between the stator 31 and the rotor 32, preferably, a material of the body 111 is plastic that has been subject to a granulation process, in which a content of glass fiber is increased to make it have tensile strength greater than 200 Mpa, bending strength greater than 250 Mpa, hydroscopicity less than 2%, and high strength stability. Plastic satisfying the foregoing parameter criteria has good size stability and can prevent the body from generating a relatively large deformation and affecting coaxiality between the stator and the rotor.

The transmission mechanism 4 located in the head shell 12 includes a conical gear group disposed by an angle. The conical gear group includes a conical pinion gear 41 connected to the armature shaft 33 and a conical bull gear 42 connected to the output shaft 2. The output shaft 2 and the armature shaft 33 are approximately vertically disposed.

The diameter of the second cylindrical portion 112 determines the perimeter of the gripping portion, and the perimeter of the gripping portion directly affects a gripping sense of a user. If the perimeter of the gripping portion is excessively long, gripping of the user is unstable, and the user is likely to get tired during operation. Based on tests, in China, palms of males have a length generally ranging from 175 mm to 200 mm and a width ranging from 80 mm to 90 mm, and palms of females have a length generally ranging from 160 mm to 180 mm and a width ranging from 65 mm to 80 mm. When the handheld angle grinder is gripped, a length of a palm surrounds the gripping portion. Usually, the perimeter of the gripping portion should be slightly greater than or slightly less than the length of the palm. If the perimeter of the gripping portion is too long, the fingers cannot completely grip the gripping portion, resulting in unstable gripping. If the perimeter of the gripping portion is too short, the thumb overlaps another finger, resulting in reduction of a gripping force. The second cylindrical portion also accommodates the motor. In consideration of factors such as a support structure of the motor and air duct, the diameter of the motor should be not greater than 58 mm.

A volume of a motor is defined as $V=\pi (D/2)^2 L/1000$, where D is a diameter of a stator, L is an axial length of the motor, a unit is mm, and a unit of the volume V of the motor is $cm^3$. The axial length L of the motor 3 is defined by a length of the stator core 311 or a length of the rotor core 321, and usually the axial length L of the stator core 311 is the same as that of the rotor core 321.

In a no-load state, a rotation speed of the motor 3 of the angle grinder 100 is required to reach approximately 38000 rpm. During an operation process, power input from a power grid to the angle grinder 100 is defined as input power P1. Power P2 output from the angle grinder 100 to a working object is output power, where P2=P1−P, and P is defined as loss, including tool heat loss, air loss, friction loss, and the like. The output power of the motor 3 is P2.

Because the output power P2 of the motor 3 is in direct proportion to a diameter D of the motor 3, an axial length L of the motor 3, a rotation speed of the motor, and a slot fill factor of the motor. Moreover, the rotation speed of the motor is constrained and affected by safety regulations and the motor service life, and basically, is not greatly changed. If it is considered to increase the diameter D of the motor 3 for improving the output power P2 of the motor, the diameter of the gripping portion needs to be increased correspondingly, resulting in difficulty in gripping by a user.

If the axial length L of the motor 3 is longer, the volume V of the motor 3 is larger, magnetic field strength is larger, and the output power P2 of the motor 3 is higher.

The rotor core 321 and the stator core 311 are usually laminate stacks formed by stacking and welding a proper quantity of metal laminates together along an axial direction, main ingredients thereof are iron, and therefore, may alternatively be referred to as iron cores. Different from a split stator, each laminate in an axial direction of an integral stator is a hollow integral one instead of being formed by splicing a plurality of small laminates. Usually, thickness of a metal laminate is 0.5 mm, and axial lengths of the stator core 311 and the rotor core 321 are overall thicknesses of proper quantities of laminates stacked together. An external contour of the integral stator may be set to be circular, elliptical, in a shape of a prolate square, or in other shape suitable for being accommodated inside the casing.

A notch 313 is arranged on each metal laminate of the stator core 311, and a notch 323 is arranged on each metal laminate of the rotor core 321. Therefore, slots are respectively formed in the laminate stack formed by the metal laminates of the stator core 311 and in the laminate stack formed by the metal laminates of the rotor core 321. Coils are respectively wound in the slot of the stator core and the slot of the rotor core slot.

Figure 5:
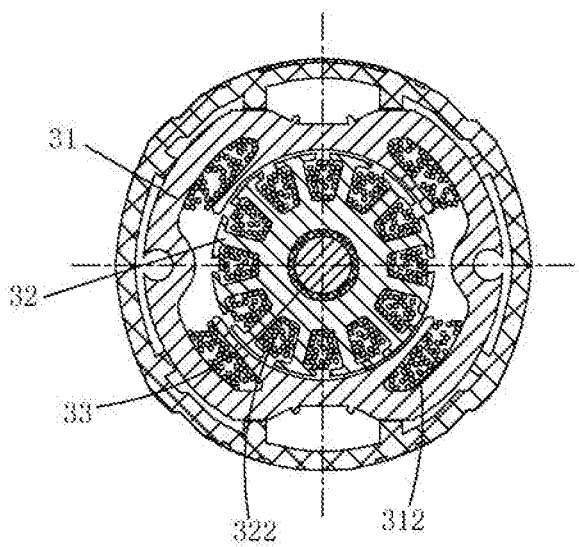
FIG. 5 is a schematic diagram of an ordinary motor.

Comparatively referring to FIG. 5, FIG. 5 shows a cross section of an ordinary motor, in which coils wound inside of a stator slot and a rotor slot are obviously sparse, a screw hole 315 configured to fix a stator to a casing is usually reserved, and existence of the screw hole 315 reduces a yoke width 311a of the stator, that is, affects a size of a stator core slot and a coil inside the slot. However, in FIG. 4, in one of embodiments, a different fixing manner is used between the stator 31 and the body 11. The screw hole is canceled, a size of a stator core slot is not affected, and the coil has a large number of turns and is densely wound. As a result, if an area of a coil wound per unit slot area is larger, a slot fill factor is higher, magnetic field strength of a motor is stronger, and output power P2 of the motor is higher.

However, after a laminate stack length and a slot fill factor of the motor 3 are increased, an overall weight of the motor 3 is increased, and particularly, a weight of the rotor 32 is increased, increasing load of the rotor 32 on the armature shaft 33. The rotor 32 of the motor is disposed in a space enclosed by the stator 31, and a radial gap of approximately 0.5 mm or below exists between the rotor 32 and the stator 31. Therefore, coaxiality between the rotor and the stator is required to be extremely high, and a tiny deviation causes friction, or referred to as scrapping, between the rotor and the stator during rotation. Scrapping generates a large amount of heat and causes ignition of the motor or a severer accident.

When the armature shaft 33 of the rotor 32 has a load, the armature shaft 33 generates a bending deformation, and if the load is increased, an amount of the deformation is increased. To prevent the armature shaft 33 from generating a relatively large deformation and causing scrapping, it needs to reduce the amount of deformation of the armature shaft 33 when the armature shaft 33 bears a load, that is, reduce deflection of the armature shaft 33. If a material of the armature shaft 33 is not changed, a diameter of the armature shaft 33 needs to be increased.

It is verified by tests that when the diameter of the armature shaft is increased by 5%, the deflection of the armature shaft 33 is reduced by 17.7%, when the diameter of the armature shaft is increased by 10%, the deflection of the armature shaft 33 is reduced by 31.7%, and when the diameter of the armature shaft is increased by 15%, the deflection of the armature shaft 33 is reduced by 42.8%. Therefore, properly increasing the diameter of the armature shaft 33 can reduce the deflection of the armature shaft 33 to a proper range.

Figure 7:
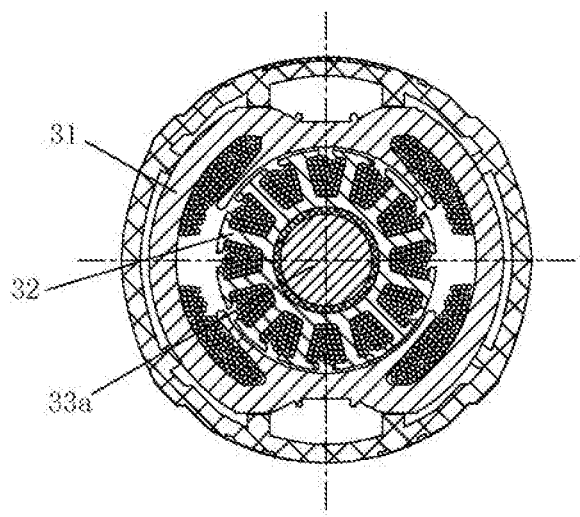
FIG. 7 is a schematic diagram of a motor having a high slot fill factor, in which a diameter of an armature shaft is increased.

Referring to FIG. 7, when the diameter of the rotor 32 is unchanged, that is, the diameter of the laminate stack of the rotor remains unchanged, when the diameter of the armature shaft 33a is increased, a yoke width 322a of the rotor is reduced, so that magnetic flux of the rotor is reduced, thereby reducing output power of the motor. It is an objectively existing contradiction that the armature shaft diameter is increased while the magnetic flux of the rotor is reduced. The present embodiment proposes that a bearing capability and motor output power of the armature shaft 33 should be ensured while improving a winding process of the motor.

TABLE 1

| Sample | Armature shaft diameter (mm) | Maximum output power (W) | Ratio to reference power | Rotation speed (rpm) |
|---|---|---|---|---|
| Reference | 7.5 | 975 | 100% | 38596 |
| 1 | 8 | 985 | 101% | 38347 |
| 2 | 8.5 | 954 | 97.8% | 38417 |
| 3 | 9 | 891 | 91.4% | 38175 |
| 4 | 9.5 | 828 | 85% | 38451 |

Table 1 shows data comparison of tests on impacts of increased diameters of an armature shaft on motor power performance when a requirement that a rotation speed of a motor of a handheld angle grinder is 38000 rpm is satisfied. Because it is difficult for a testing machine to stabilize the rotation speed at 38000 rpm, a rotation speed in an actual test is slightly higher than 38000 pm. In this way, results obtained from the tests fall within an acceptable range. In addition, because a tested motor requires a carrier to fix the motor and apply a load to the motor, the motor is tested in a handheld electric tool, for example, in an angle grinder.

As shown in Table 1, a reference sample is that a diameter of an armature shaft is 7.5 mm, and power is 975 W. Four measurement samples are compared with the reference sample, in which the diameter of the armature shaft is increased by an equal difference. By means of tests, if a reference diameter of the armature shaft is 7.5 mm plus 0.5 mm, the motor power is increased by 1%. When the diameter of the armature shaft is 8 mm plus 0.5 mm to 1 mm, a loss rate of motor power is 3% or below, Compared with working requirements of the handheld angle grinder, the loss rate falls within in an acceptable range. When the diameter of the armature shaft exceeds 9.5 mm, a loss speed of the motor power is increased, and the motor power is merely 85% of that of the reference sample. In this embodiment, the diameter of the armature shaft is not less than 7.5 mm, to ensure motor power and a bearing capability of the armature shaft. In an embodiment, the diameter of the armature shaft 33 ranges from 7.5 mm to 9 mm. In this way, not only the power of the motor satisfies a requirement, but also normal working of the motor normal is ensured.

On a stator laminate, an area between the stator slot and the outer diameter of the stator is defined as a stator yoke width 311a. The stator yoke width 311a affects magnetic flux of the stator. If the stator yoke width 311a is larger, magnetic flux is larger, and output power P2 of the motor is higher. A slot for winding a coil and a bore embedded into the rotor need to be reserved on the stator laminate. Referring to FIG. 5, a screw hole 315 configured to fix the stator to the casing is usually reserved on the stator laminate.

Referring to FIG. 4, to increase an area of the stator slot, in this embodiment, a fit between the stator 31 and the body 11 is changed into an interference fit, the screw hole is canceled, and a width of the stator yoke width 311 is increased to 3.6 mm or higher. In an alternative embodiment, the stator yoke width ranges from 3.6 mm to 4.2 mm, so as to further increase a size of the slot, configured to winding more coils, thereby improving magnetic flux.

The bore of the stator 31 is configured to be embedded into the rotor 32, a gap is kept between the stator 31 and the rotor 32, to ensure that there is no friction between the rotor and the stator when the rotor rotates at a high rate. If the bore of the stator 31 is enlarged, the diameter of the rotor 32 can be increased correspondingly, and magnetic flux of the rotor can be increased. However, enlargement of the bore of the stator 31 also reduces a size of the stator yoke width 311a, and on the contrary reduce the magnetic flux of the stator 31. There is another objective existing contradiction that the bore of the stator is enlarged, but the magnetic flux of the stator is reduced.

With regard to the two foregoing objectively existing contradictions, the present embodiment researches an impact of a proportion of an outer diameter of a stator to an outer diameter of a rotor of a motor and resolving a problem of relationships between power and each of outer diameters of the stator and the rotor.

Table 2 shows variations of a ratio of power to a volume of a motor under conditions of different stator yoke widths and that a ratio of the outer diameter of the rotor to the outer diameter of the stator changes when the diameter of the stator is 50 mm, the axial length of the motor is 50 mm. Values of Table 2 represent that power of the motor fluctuates when the volume of the motor is the same, and the stator yoke width is increased or the ratio of the outer diameter of the rotor to the outer diameter of the stator is increased. When the ratio of the outer diameter of the rotor to the outer diameter of the stator is kept at 0.62, the ratio of the power to the volume reaches a maximum of 10.05 when the stator yoke width is 3.8 mm. When the stator yoke width is kept at 4 mm, the ratio of the power to the volume reaches a maximum of 10 when the ratio of the outer diameter of the rotor to the outer diameter of the stator is 0.62. In Table 2, when the yoke width of the stator ranges from 3.8 mm to 4.2 mm, and the ratio of the outer diameter of the rotor to the outer diameter of the stator ranges from 0.62 to 0.64, the ratio of the power to the volume of the motor is relatively high, and particularly, when the yoke width of the stator is 3.8 mm, and the ratio of the outer diameter of the rotor to the outer diameter of the stator is 0.62, the ratio of the power to the volume of the motor is the largest.

TABLE 2

| Ratio of an outer diameter of a rotor to an outer diameter of a stator | Ratio of power to a volume (W/cm$^3$) Stator yoke width (mm) | | | | | |
| --- | --- | --- | --- | --- | --- | --- |
|  | 3.6 | 3.8 | 4.0 | 4.2 | 4.4 | 4.6 |
| 0.65 | 8.8 | 9 | 8.8 | 8.6 | 8.5 | N/A |
| 0.64 | 8.9 | 10.02 | 9.6 | 9.2 | 8.6 | 8.2 |
| 0.62 | 9 | 10.05 | 10 | 9.2 | 8.8 | 8.6 |
| 0.58 | 8.8 | 9.5 | 9.4 | 8.8 | 8.5 | N/A |

The ratio of the power to the volume of the motor reflects a value of power output efficiency of the motor. Under the same volume, if the ratio is lager, the efficiency of the motor is higher. In Table 2, the power of the motor is a power value when the rotation speed of the motor reaches 38000 rpm. The ratio of the outer diameter of the rotor to the outer diameter of the stator and the stator yoke width both affect the ratio of the power to the volume of the motor. If the ratio of the outer diameter of the rotor to the outer diameter of the stator is larger, a size of the rotor is larger, and the stator yoke width 311 is correspondingly reduced, and vice versa. If the stator yoke width is larger, a size of the slot of the stator and a size of the rotor are correspondingly reduced, and vice versa. The power of the motor may reach a larger value if the ratio of the outer diameter of the rotor to the outer diameter of the stator and the yoke width are properly designed.

In this embodiment, the ratio of the power to the volume of the motor is selected to be greater than 8.5. In this way, under the same motor volume, in particular, under the same stator diameter, the handheld angle grinder provides a comfortable gripping sense and has higher power.

Referring to Table 2, power of the motor fluctuates when the volume of the motor is the same, and the stator yoke width is increased or the ratio of the outer diameter of the rotor to the outer diameter of the stator is increased. In an embodiment, the ratio of the outer diameter of the rotor to the outer diameter of the stator ranges from 0.6 to 0.7, and the outer diameter of the stator is not greater than 58 mm. Preferably, the outer diameter of the stator is not greater than 50 mm. In another alternative embodiment, the ratio of the outer diameter of the rotor to the outer diameter of the stator ranges from 0.6 to 0.65, and the yoke width ranges from 3.6 mm to 4.2 mm. If the yoke width is too large, an area of the slot is reduced, resulting in reduction in a quantity of windings of the stator. In such a size range, the power of the motor fluctuates in a range close to a maximum value. In this case, the axial length of motor, that is, the axial length of the stator along the armature shaft, is set to be not less than 40 mm, to range from 45 mm to 60 mm, and preferably, is 55 mm.

In one of embodiments, output power P2 of the motor 3 to a peripheral perimeter of a gripping portion of an angle grinder is greater than 5.1 W/mm. The output power P2 herein is maximum output power output by the angle grinder to a working object. A peripheral perimeter of a gripping portion of a handheld angle grinder 1 ranges from 150 mm to 185 mm. To enable an inner side of the gripping portion to have an enough space for accommodating the motor 3, an outer diameter of a stator 31 is not greater than 58 mm.

In another alternative embodiment, a peripheral perimeter of a gripping portion of a handheld angle grinder 100 is set to range from 165 mm to 182 mm, and an outer diameter of a stator 31 is not greater than 50 mm. An axial length L of a motor is not less than 40 mm, and a ratio of output power P2 of the motor 3 to the peripheral perimeter of the gripping portion of the angle grinder is greater than 5.2 W/mm.

In another alternative embodiment, a ratio of output power P2 of a motor 3 to a peripheral perimeter of a gripping portion of an angle grinder is greater than 5.35 W/mm.

A material of a head shell 12 of a handheld angle grinder 100 is usually metal, and the head shell 12 is mainly made from aluminum having relatively high strength. When a weight of a rotor 32 is increased, a second bearing chamber 122 does not generate a relatively large deformation and affect coaxiality between the rotor 32 and the stator 31. A body 11 is made of plastic, and a first bearing chamber 111 is integrally formed on the body 11. To ensure that the body 11 has enough strength to prevent the first bearing chamber 111 and a fixing element 113 from generating a relatively large deformation and affecting coaxiality between the stator and the rotor, preferably, a material of the body 11 is plastic that has been subject to a granulation process, in which a content of glass fiber is increased to make it have tensile strength greater than 200 Mpa, bending strength greater than 250 Mpa, hydroscopicity less than 2%, and high strength stability. Plastic satisfying the foregoing parameter criteria has good size stability and can prevent the body from generating a relatively large deformation and affecting coaxiality between the stator and the rotor.

Both a gripping portion and a heat dissipation portion 115 are approximately cylindrical, and extend along an axial direction of an armature shaft 33, and length directions of the gripping portion and the heat dissipation portion 115 are the same as the axial direction of the armature shaft 33.

When an air inlet and an air outlet are designed, design personnel needs to consider a relationship between areas of the two. Usually, the area of the air inlet needs to be greater than the area of the air outlet. If the air inlet is larger, an ideal air inlet amount is larger. However, if the air inlet amount is too large, cooling air loses guiding, forms a flow around the air inlet, enters through the air inlet, and the flows out from the air inlet, or the cooling air is prevented from being successfully discharged, resulting in reduction of cooling efficiency. In this embodiment, a proportion of the area of the air inlet to the area of the air outlet is greater than 1, and preferably, ranges from 1.2 to 1.4.

TABLE 3

Ratio of power to a volume (W/cm$^3$)

| Ratio of an outer diameter of a rotor to an outer diameter of a stator | Stator yoke width (mm) | | | | | |
|---|---|---|---|---|---|---|
| | 3.4 | 3.5 | 3.6 | 3.7 | 3.8 | 4.0 |
| 0.65 | 8 | 8.3 | 8.9 | 8.7 | 8.5 | 8.2 |
| 0.62 | 7.9 | 8.96 | 10.2 | 9.49 | 8.78 | 8.6 |
| 0.60 | 7.84 | 7.98 | 8.6 | 8.3 | 8.15 | 8.45 |
| 0.58 | N/A | 7.9 | 8.1 | 8 | 7.83 | 7.81 |

In an embodiment, a peripheral perimeter of a gripping portion of a handheld angle grinder 100 ranges from 165 mm to 170 mm, a length of a laminate stack is not less than 50 mm, and an outer diameter of a stator is not greater than 46 mm. Output power P2 of a motor 3 to the peripheral perimeter of the gripping portion of the angle grinder is greater than 5.15 W/mm. A diameter of an armature shaft is set to be not less than 7.5 mm.

Table 3 shows variations of a ratio of power to a volume of a motor under conditions of different stator yoke widths and that a ratio of an outer diameter of a rotor to the outer diameter of the stator changes when the diameter of the stator is 46 mm. Similar to the test results in Table 2, values in Table 3 represent that power of the motor fluctuates when the volume of the motor is the same, and the stator yoke width is increased or the ratio of the outer diameter of the rotor to the outer diameter of the stator is increased. When the ratio of the outer diameter of the rotor to the outer diameter of the stator is kept at 0.62, the ratio of the power to the volume reaches a maximum of 10.2 when the stator yoke width is 3.6 mm. When the stator yoke width is kept at 4 mm, the ratio of the power to the volume reaches a maximum of 8.6 when the ratio of the outer diameter of the rotor to the outer diameter of the stator is 0.62. In Table 3, when the yoke width of the stator ranges from 3.5 mm to 3.7 mm, and the ratio of the outer diameter of the rotor to the outer diameter of the stator ranges from 0.62 to 0.65, the ratio of the power to the volume of the motor is relatively high, and particularly, when the yoke width of the stator is 3.6 mm, and the ratio of the outer diameter of the rotor to the outer diameter of the stator is 0.62, the ratio of the power to the volume of the motor is the largest.

In another alternative embodiment, the diameter of the armature shaft ranges from 7.5 mm to 9 mm, and preferably, is 8 mm.

In an embodiment, if the diameter of the stator of the motor is 55 mm, the peripheral perimeter of the gripping portion of the angle grinder accommodating the motor is larger, the power of the motor is also increased. Table 4 shows variations of the ratio of the power to the volume of the motor under conditions of different stator yoke widths and that the ratio of the outer diameter of the rotor to the outer diameter of the stator changes when the diameter of the stator is 55 mm. The power of the motor fluctuates when the volume of the motor is the same, and the stator yoke width is increased or the ratio of the outer diameter of the rotor to the outer diameter of the stator is increased. In Table 4, when the yoke width of the stator ranges from 4.1 mm to 4.3 mm, and the ratio of the outer diameter of the rotor to the outer diameter of the stator ranges from 0.618 to 0.636, the ratio of the power to the volume of the motor is relatively high, and particularly, when the yoke width of the stator is 4.2 mm, and the ratio of the outer diameter of the rotor to the outer diameter of the stator is 0.636, the ratio of the power to the volume of the motor is the largest.

TABLE 4

Ratio of power to a volume (W/cm$^3$)

| Ratio of an outer diameter of a rotor to an outer diameter of a stator | Stator yoke width (mm) | | | | | |
|---|---|---|---|---|---|---|
| | 4 | 4.1 | 4.2 | 4.3 | 4.4 | 4.5 |
| 0.655 | 10.28 | 10.2 | 10.12 | 9.81 | 9.55 | 9.13 |
| 0.636 | 10.3 | 11.01 | 11.79 | 11.32 | 10.85 | 9.82 |
| 0.618 | 10.46 | 10.76 | 11.05 | 10.64 | 10.1 | 9.16 |
| 0.6 | 10.3 | 10.72 | 10.96 | 10.32 | 9.88 | 9.15 |

An increase of the power of the motor causes the motor to generate more heat during working, reduction of the diameter of the gripping portion leads to reduction of an area of a heat dissipation air duct, and after the laminate stack is elongated, its heat dissipation air duct is also elongated. The foregoing factors cause a rise in the temperature of the motor. Therefore, it is necessary to optimize air duct design and improve heat dissipation efficiency of the motor.

The handheld electric tool 100 includes a tail cover 150 sleeved over a tail end of the body 11 and a guide member 170 located between the body 11 and the tail cover 150. The guide member 170 and the tail cover 150 form an air inlet passage 190.

Several components 5 are disclosed on a tail end of a casing 110, and the several components 5 are specifically a capacitor, a switch, and the like.

In this embodiment, an air inlet 1151 is arranged on the tail cover 150. When an electric tool 100 works, cooling air that enters through the air inlet into the heat dissipation portion 115 and flows through the motor 3 reduces heat of the motor 3, thereby performing heat dissipation.

In this embodiment, the air inlet 1151 on the tail cover 150 includes a first air inlet 151 enabling cooling air to enter the air inlet passage along an axial direction of the motor 3, and a second air inlet 153 enabling cooling air to enter the air inlet passage along a direction perpendicular to the axial direction of the motor 3. Certainly, alternatively the first air inlet 151 or the second air inlet 153 may be only arranged on the tail cover 150.

Figure 8:
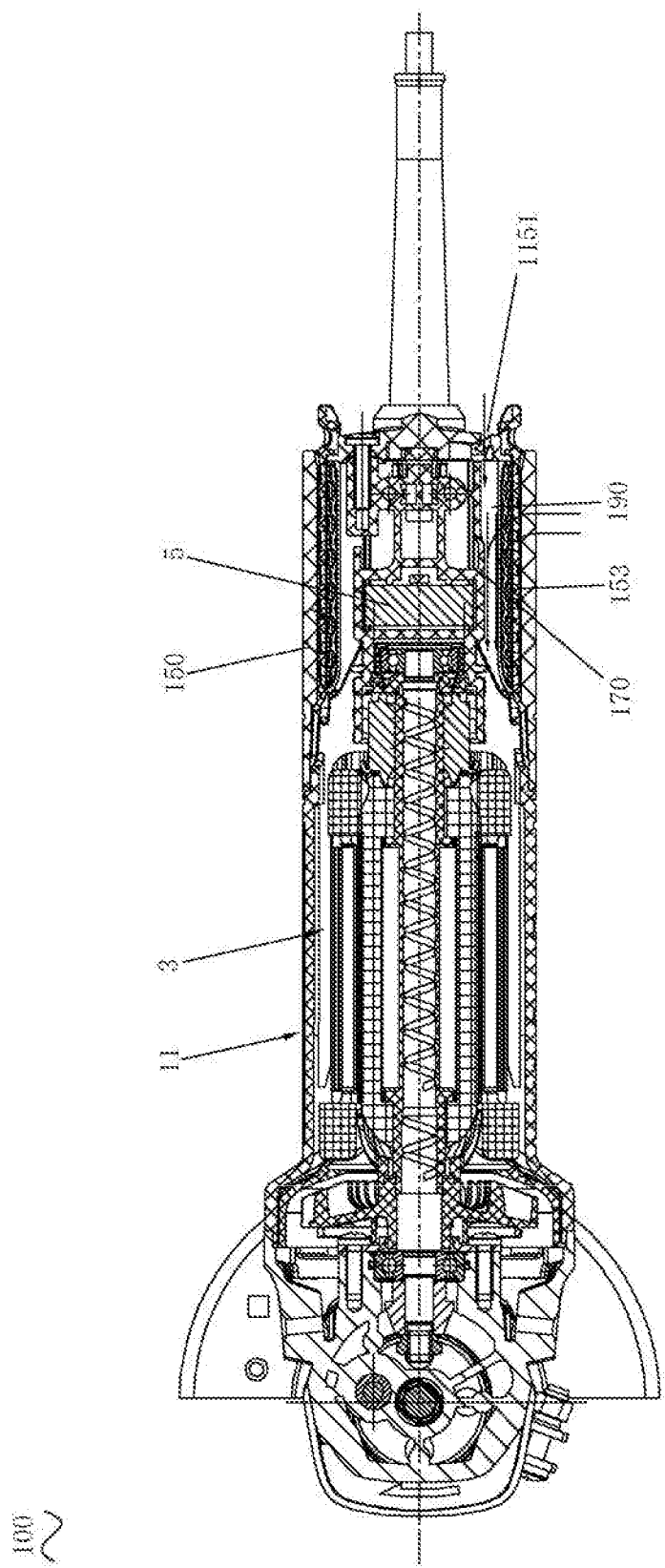
FIG. 8 is a cross-sectional view along a III-III direction in FIG. 1.
Figure 9:
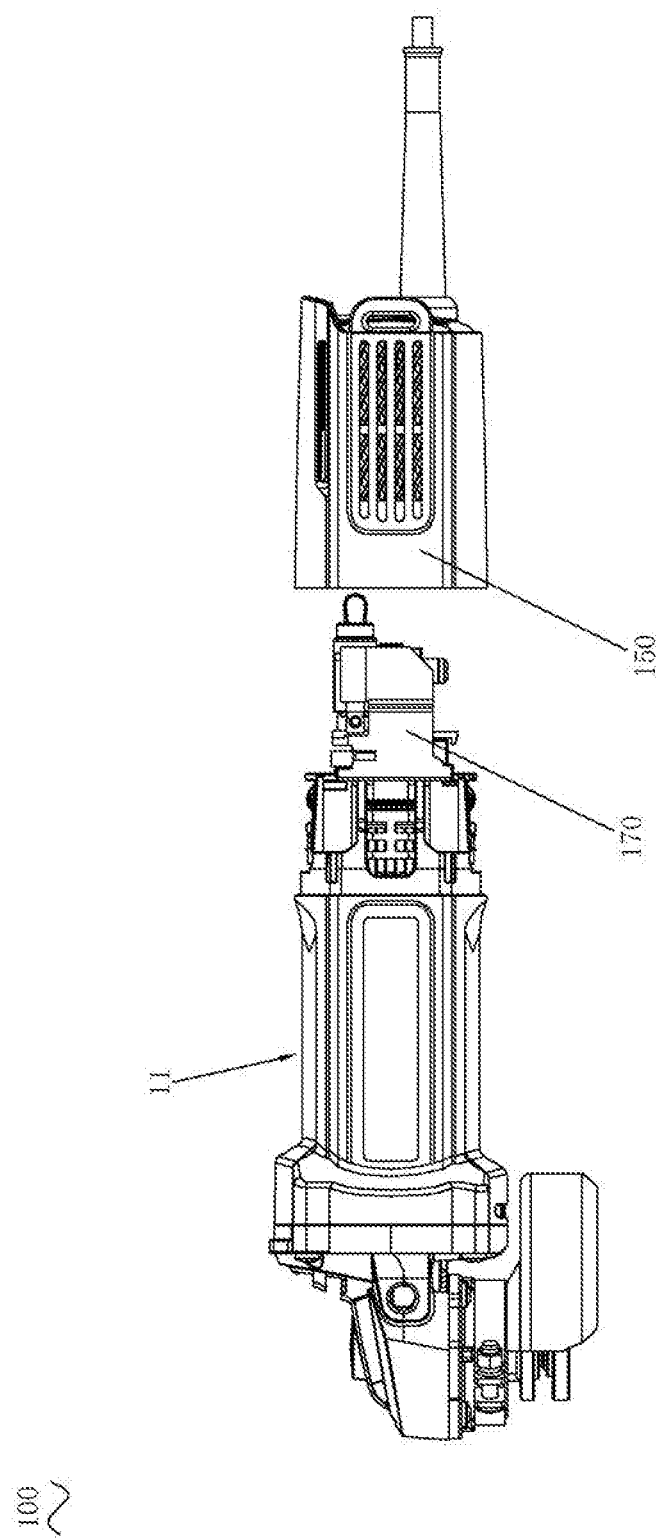
FIG. 9 is a schematic structural exploded view of an angle grinder.

The guide member 170 and the tail cover 150 form an air inlet passage 190 in a surrounding manner. Specifically, the air inlet passage 190 extends along the axial direction of the motor 3 or inclines by an angle to the axial direction of the motor 3. The air inlet passage 190 is in communication with the air inlet, and the air inlet passage 190 is in communication with the interior of the motor. The cooling air that enters through the air inlet flows along the air inlet passage 190 to the motor 3. Specifically, a direction indicated by arrows in FIG. 8 is a flowing direction.

The component 5 is located at a position outside the air inlet passage 190. Preferably, the air inlet passage 190 and the component 5 are located on different sides of the guide member 170. To be specific, the guide member 170 separates the air inlet passage 190 and the component 5 on two sides of the guide member 170, so that the cooling air that enters through the air inlet no longer flows through component 5, to avoid a situation that the cooling air is blocked by the component 5 and forms a vortex, thereby enabling more cooling air that enters through the air inlet to flow to the motor 130, and improving an effective cooling air amount and cooling efficiency. Therefore, a heat dissipation effect of the electric tool 100 is enhanced, so that a phenomenon that temperatures of the motor and the casing are increased because of a poor heat dissipation effect is avoided, so that comfort at a gripping potion of the casing is improved, and operation of operator is facilitated.

In this embodiment, the guide member 170 is disposed on the casing 110. Specifically, the guide member 170 may be integrally formed together with the body 11, or may be fixedly connected to the body 11, for example, in a welded connection, threaded connection, or clamped connection manner. If the guide member 170 is integrally formed together with the body 11, a sidewall of the body 11 may be used as a guide member provided that a side wall of a housing and the tail cover 150 can form an air inlet passage 190 in a surrounding manner.

Certainly, the guide member 170 may alternatively be disposed on the tail cover 150. Similarly, the guide member 170 may be integrally formed together with the tail cover 150, or may be fixedly connected to the tail cover 150, for example, in a welded connection, threaded connection, or clamped connection manner.

In this embodiment, the guide member 170 is an integral structure. Certainly, the guide member 170 may alternatively be formed by splicing a plurality of sub-guide members. The guide member 170 may be in a regular or irregular shape.

In another embodiment, the guide member 170 in a plate shape, so facilitate machining and making ventilation of cooling air smooth. Preferably, the guide member 170 is parallel to the axial direction of the motor 3, to make ventilation of cooling air smoother.

In another embodiment, the guide member 170 extends along an axial direction of the motor 3, and a cross section of the guide member 170 perpendicular to the axial direction of the motor 3 is a curved surface. Preferably, a cross section of the guide member 170 perpendicular to the axial direction of the motor 3 is in a fan shape.

It should be noted that the guide member 170 is not limited to the foregoing shapes and may present another regular or irregular shape provided that the guide member 170 can separate the air inlet passage 190 from the component 5, to enable cooling air that enters through the air inlet to directly flow to the motor 3 and no longer flow through the component 5.

In this embodiment, materials of the guide member 170 and the body 11 are the same. Certainly, the guide member 170 may alternatively be made from another material. Preferably, the guide member 170 is made from a waterproof material to prevent the component 5 from performance degradation because of dampness.

In this embodiment, the electric tool 100 is an angle grinder. Certainly, the electric tool 100 is not limited to an angle grinder and may alternatively, be an electric tool of another type that has a motor and that performs heat dissipation by using cooling air.

In the foregoing electric tool, the cooling air that enters through the air inlet flows to the motor through the air inlet passage, and the component is located at a position outside the air inlet passage, so that the cooling air that enters through the air inlet no longer flows through the component. This avoids a situation in which the cooling air from is blocked by the component and forms a vortex, so that more of the cooling air that enters through the air inlet flows to the motor, thereby improving an amount of effective cooling air and cooling efficiency.

Referring to FIG. 10 to FIG. 18, in one of embodiment, the handheld electric tool is an oscillating power tool. The oscillating power tool 600 includes a housing 610, a motor 3 accommodated inside the housing 610, an output shaft 620 extending out from an interior of the housing 610, a working head (not shown) mounted on an extension end 621 of the output shaft 620, and a clamping component 623 configured to clamp the working head in an axial direction of the output shaft 620.

A structure of the motor 3 is the same as the structure of the motor 3 in the angle grinder 100 in the foregoing embodiment of the present invention. Specific structural details are not described herein again. The only differences are different outer diameters of the motor 3 and different no-load rotation speeds (a no-load rotation speed when being mounted in a tool without a speed stabilizer). Further descriptions are provided below.

Figure 10:
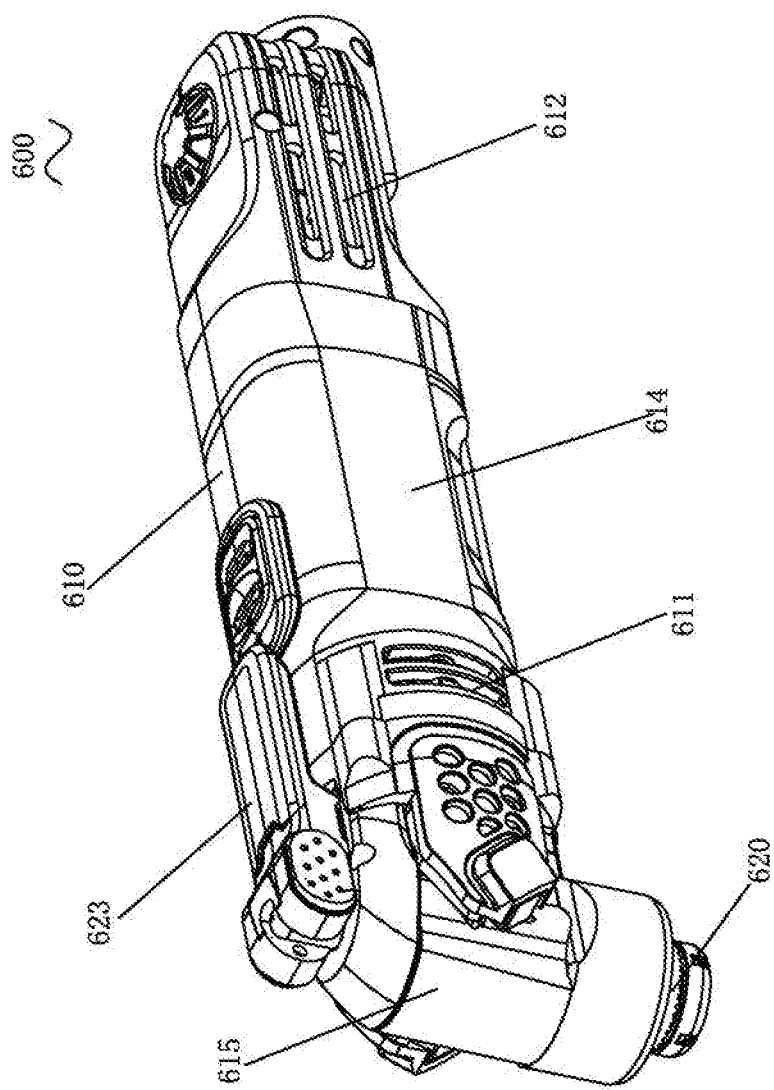
FIG. 10 is a three-dimensional diagram of an oscillating power tool according to an embodiment.

Referring to FIG. 10, the housing 610 has a top, a bottom opposite to the top, and two side portions connecting the top and the bottom. An end of the housing 610 proximal to the output shaft 30 is provided with two groups of air outlets 611, symmetrically disposed on the left and right side portions of the housing 610.

In addition, an extension end of the housing 610 distal to a direction of the working head is further provided with two groups of air inlets 612. In this implementation, the housing 610 has two groups of the air inlets 612, symmetrically disposed on the left and right side portions of the extension end of the housing 610.

The oscillating power tool 600 includes a fan 650 accommodated in the housing 610. The fan 650 is disposed in an area located between the motor 3 and the output shaft 620 and is close to positions of the air outlets 611. The fan 650 is mounted on an armature shaft 33 and driven by the armature shaft 33. When the motor 3 drives the armature shaft 33 to rotate, the fan 650 is driven by the armature shaft 33 to rotate at a high speed, suck in cold air outside through the air inlets 612 on the extension end of the housing 610. The cold air passes through the circuit board 670, and then passes through the whole motor 3, and subsequently, the fan 650 discharges the air carrying heat through the air outlets 611 of the housing 610.

A centrifugal fan may be specifically selected as the fan 650. Such a setting can discharge hot air through the air outlets 611 better.

Figure 11:
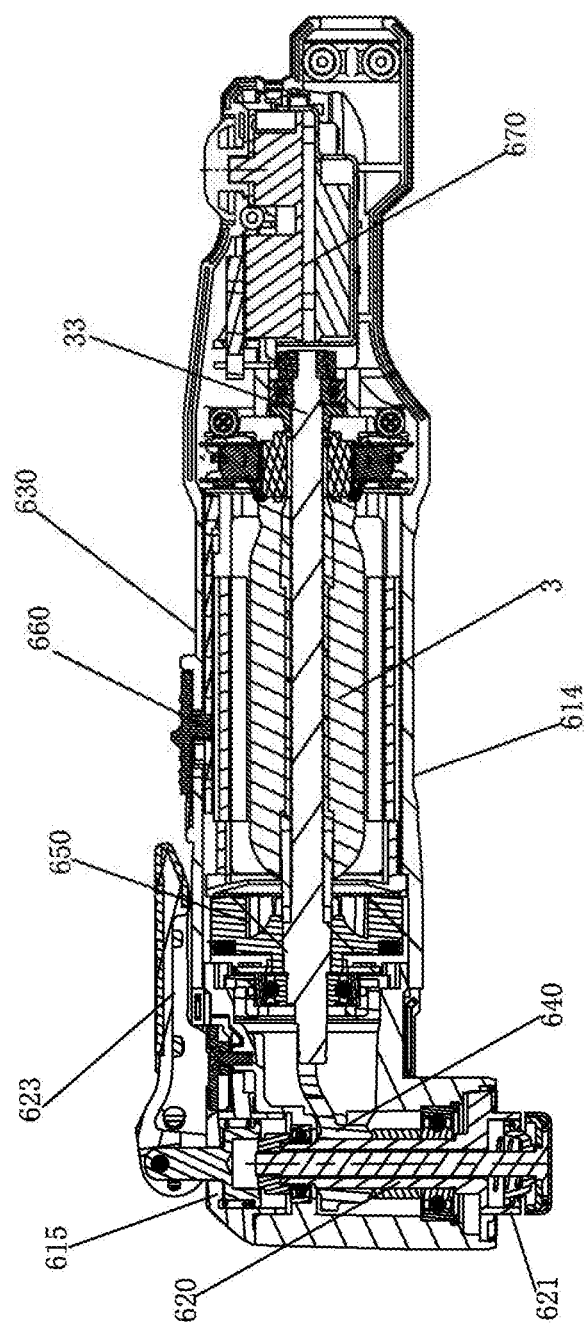
FIG. 11 is a cross-sectional view along a IV-IV direction of FIG. 10.
Figure 12:
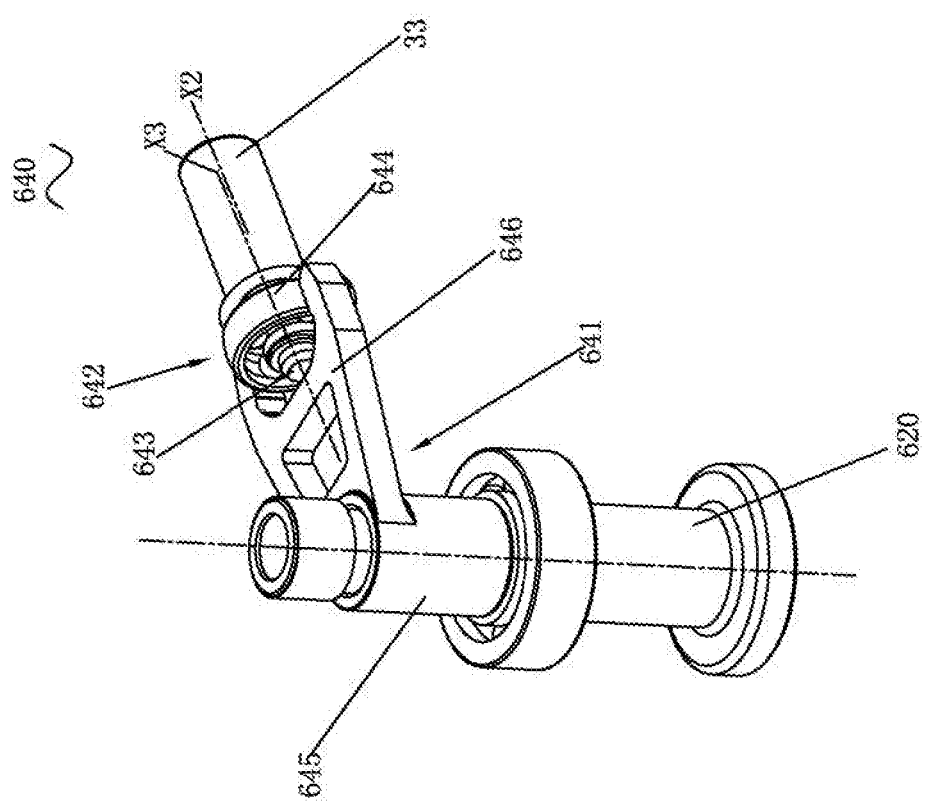
FIG. 12 is a three-dimensional diagram of a transmission mechanism of an oscillating power tool according to an embodiment.
Figure 13:
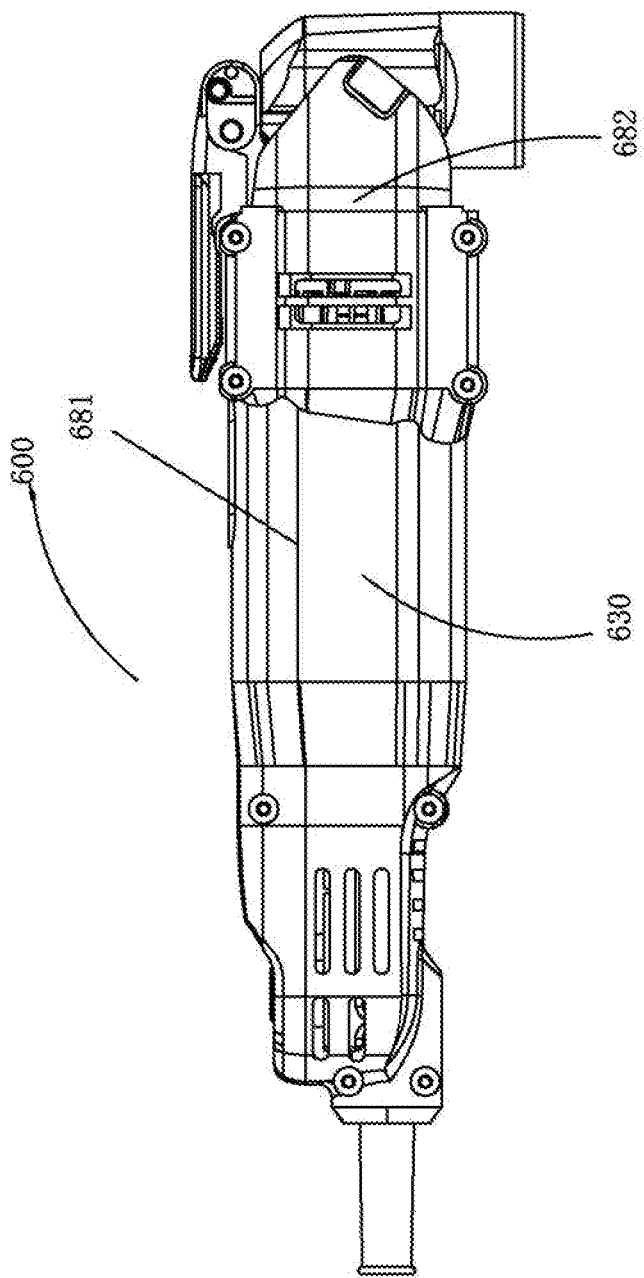
FIG. 13 is a front view of an oscillating power tool according to an example embodiment.

Further referring to FIG. 11 and FIG. 12, a transmission mechanism is disposed between the armature shaft 33 and the output shaft 620. In this implementation, the transmission mechanism is an eccentric transmission mechanism 640. The eccentric transmission mechanism 640 is disposed inside the housing 613 and includes a shifting fork 641 and an eccentric component 642 connected onto the armature shaft 33. The eccentric component 642 includes an eccentric shaft 643 connected onto the armature shaft 33 and a driving wheel 644 mounted on the eccentric shaft 643. An end of the shifting fork 641 is connected to a top of the output shaft 620, and the other end thereof matches a driving wheel 644 of the eccentric component 642. The shifting fork 641 includes a bushing 645 sleeved over the output shaft 620 and a fork-shaped portion 646 that extends from a top of the bushing 645 horizontally toward a direction perpendicular to the armature shaft 33. In this implementation, the driving wheel 644 is a bead bearing, and has a spherical outer surface matching the fork-shaped portion 646 of the shifting fork 641. The eccentric shaft 643 is eccentrically connected to the armature shaft 33. To be specific, an axis line X3 of the eccentric shaft 643 does not overlap an axis line X2 of the armature shaft 33, and radially deviates by a spacing. The fork-shaped portion 646 of the shifting fork 641 coats two sides of the driving wheel 644, and is in close slidable contact with an outer surface of the driving wheel 644.

When the motor 3 drives the armature shaft 33 to rotate, the eccentric shaft 643 is driven by the armature shaft 33 to eccentrically rotate relative to an axis line X2 of the armature shaft 33, so as to drive the driving wheel 644 to eccentrically rotate relative to the axis line X2 of the armature shaft 3. Driven by the driving wheel 644, the shifting fork 641 swings relative to an axis line Y of the output shaft 620, to further drive the output shaft 620 to swing around its own axis line Y. The output shaft 620 swings to drive a working head mounted thereon to swing to perform machining on a workpiece.

In this embodiment, a swing angle of the output shaft 620 is 5°. A swing frequency of the output shaft 620 ranges from 18000 rpm to 20000 rpm. Setting the swing angle of the output shaft 620 to 5° greatly improves working efficiency of the working head, and when the working head is a saw blade, discharging of sawdust is facilitated. It should be pointed out that in the oscillating power tool of the present embodiment, the swing angle of the output shaft 620 is not limited to only 5°, and may be set to value greater than or equal to 5° according to requirements. The swing frequency of the output shaft 620 is also not limited to a range of 18000 rpm to 20000 rpm, and is preferably greater than 10000 rpm.

Referring to FIG. 11, in the present embodiment, the output shaft 620 is configured to install a working head. The output shaft 620 is installed in the housing 610 and extends out of the housing 610, so that it is easy to install the working head (not shown) on the output shaft 620. The motor 3 provides power to the oscillating power tool 600. The power of the motor 3 is transmitted to the output shaft 620 through the transmission mechanism 640, so that the oscillating power tool 600 implements an oscillating operation. Moreover, the output shaft 620 extends out of the housing 610, and the output shaft 620 is connected to the transmission mechanism 640, so that the transmission mechanism 640 can transmit the power of the motor 3 to the output shaft 620 and further the output shaft 620 drives the working head to implement an oscillating operation. When the oscillating power tool 600 operates, the transmission mechanism 640 moves to transmit the power of the motor 3 to the output shaft 620, and the output shaft 620 drives the working head to move to implement an oscillating motion of the oscillating power tool 600. The working head includes a straight saw blade, a circular saw blade, a triangular disc sander, a shovel shaped scraper, or the like. After installing different tool bits on the output shaft 620, an operator may implement various operating functions, such as sawing, cutting, grinding, and scraping, so as to adapt to different working demands and make it easy to use the oscillating power tool 600.

The housing 610 extends along the axis line of the motor 3 and may be divided into a first area 614 distal to the output shaft 620 and a second area 615 proximal to the output shaft 620. The first area 614 accommodates the motor 3, and includes a gripping portion 630 formed on an outer side of the motor 3 for a user to grip, and a power supply control switch 660 disposed close to the gripping portion 630 or directly disposed on the gripping portion 630. The second area 615 accommodates the transmission mechanism 140. The gripping portion 630 has a first cross section 6151, and the first cross section is located within a lamination length range of the motor 3. The second region 615 has a second cross section 6141, the area of the first cross section 1141 is smaller than the area of the second cross section 1151, and the first cross section 1141 is parallel to the second cross section 1151. That is, an overall size of an external profile of the gripping portion 630 is less than that of the second region 615. Apparently, by means of this design, it is easier for a user to hold and meanwhile, fatigue caused by long time holding of the oscillating power tool can be alleviated.

Certainly, the size of the gripping portion 630 cannot be changed randomly, and it is necessary to simultaneously consider factors such as internal elements (for example, the motor 3 and a carbon brush 34) selected to be in the gripping portion 630, design of positions of the elements, and arrangement of heat dissipation ducts.

The length of the first cross section 1151 of the gripping portion 630 in the vertical direction is not equal to the length thereof in the horizontal direction, that is, the width and the height are not equal, and the size in the vertical direction is larger. The gripping portion 630 coats on an external profile of the motor 3, and therefore an appearance of the gripping portion 630 depends on that of the motor 3 to some extent.

Figure 16:
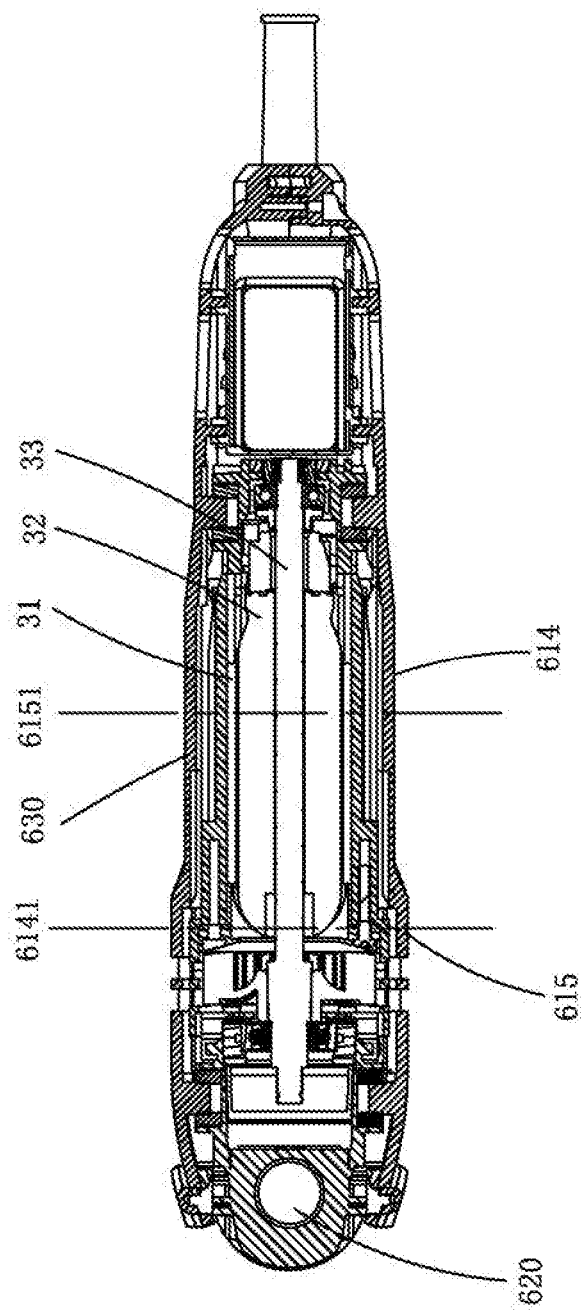
FIG. 16 is a top sectional view of an oscillating power tool according to an example embodiment.

Referring to FIG. 16, in this embodiment, the external profile of the motor 3 is substantially the same as that of the gripping portion 630, that is, the external profile of the motor 3 is not a conventional regular cylinder. The external profile of the motor 3 is an external profile of a stator 31 of the motor 3. In this embodiment, the external profile of the stator 31 of the motor 3 is enclosed by connecting two arc edges 6211 and two straight edges 6212. The two straight edges 6212 extend in a direction parallel to a first central line a, the two arc edges 6211 substantially extend in a direction parallel to a second central line b, and the external profile of the stator 31 is symmetrical relative to both the first central line a and the second central line b. The length of the straight edge 1212 in the direction parallel to the first central line a is greater than the length of the arc edge 1211 in the direction parallel to the second central line b. In this embodiment, the length of the straight edge 1212 in the direction parallel to the first central line a (which is the height in this embodiment) is greater than 45 mm, and the length of the arc edge 1211 in the direction parallel to the second central line b (which is the width in this embodiment) is in a range of 36 mm to 43 mm. Certainly, for different holding habits by the different user, the external profile of the stator may alternatively be designed to have a small height and a large width, and the gripping portion 630 is changed adaptively. For example, the arc edges 6211 are disposed vertically and the straight edges 6212 are disposed horizontally.

Figure 17:
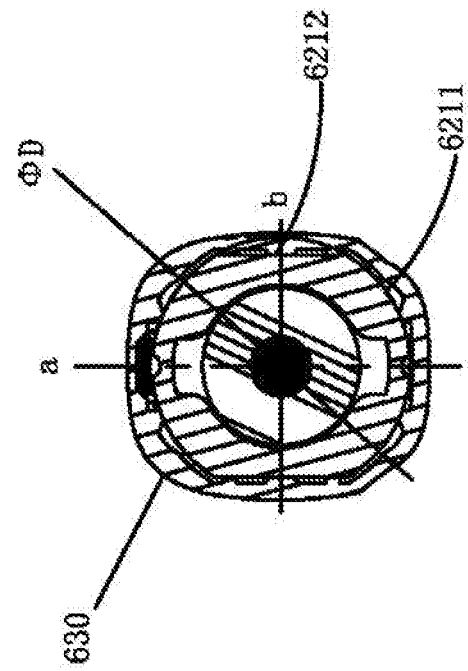
FIG. 17 is a side sectional view of an oscillating power tool according to an example embodiment.
Figure 18:
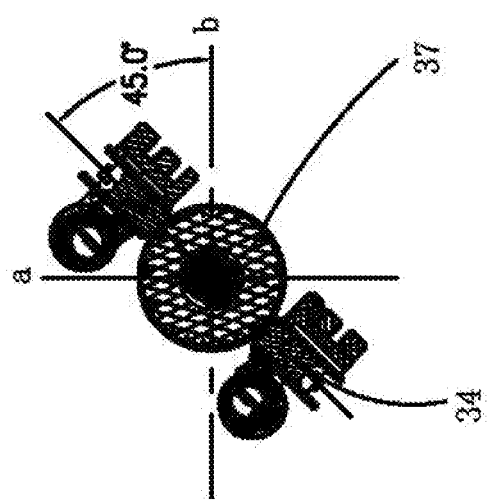
FIG. 18 is an arrangement schematic diagram of a carbon brush and a commutator of an oscillating power tool according to an example embodiment.

Referring to FIG. 16 and FIG. 18, the motor 12 is a brush motor and includes a motor shaft 33, a stator 31, a rotor 32, and a commutator 37 disposed on the motor shaft. The commutator 37 may alternatively be disposed in the gripping portion 630. The carbon brush 34 is disposed exactly opposite to the commutator 37 and abuts against the commutator 123. The carbon brush 34 is disposed in a direction at an acute angle or an obtuse angle with the straight edges, that is, the carbon brush is disposed at an acute angle or an obtuse angle with the first central line a. In other words, the arrangement direction of the carbon brush 34 is not parallel to the first central line a and the second central line b. With reference to FIG. 17, the carbon brush 34 is disposed at an angle of 45 degrees with both the first central line a and the second central line b. Certainly, due to differences in the shape of the gripping portion, the arrangement direction and the first central line a may alternatively present another angle. By disposing the carbon brush 34 in this way, no extra internal space in the gripping portion 630 is occupied, and neither the size of an internal profile of the gripping portion nor the size of the external profile is increased on the premise that the thickness of the gripping portion 630 remains unchanged.

The motor 3 is installed in the housing 610 and is connected to the transmission mechanism received in the housing 610. An outer diameter D of the motor 3 is in a range of 40 mm to 50 mm, that is, an outer diameter D of the stator is in a range of 40 mm to 50 mm, and the length L of the stator (the length of an effective magnetic field) is not less than 45 mm. The motor 3 is a power source of the oscillating power tool 600. The motor 3 drives the transmission mechanism to move, so that the transmission mechanism is caused to drive the output shaft to rotate, and further drive the working head to operate. Meanwhile, the outer diameter D of the motor 3 is in the range of 40 mm to 50 mm, the size of the oscillating power tool 600 can be reduced and further the holding size is reduced, so that it is easy for an operator to hold and the comfort level during holding is improved. Compared with a current oscillating machine, in the present utility model, the outer diameter of the motor 3 is reduced and the size of the housing 610 is correspondingly decreased, so that an operator can hold the oscillating power tool 600 more conveniently during use of the oscillating power tool 600, and the comfort level during holding is improved.

In this embodiment, the oscillating power tool 600 is an oscillating machine, an oscillating motion is implemented through the oscillating machine, and it is easy for an operator to operate an object. During use, different working head may be installed in the oscillating machine to adapt to different usage requirement. This is convenient and efficient.

For a current oscillating machine, an operator needs to hold the oscillating machine when using the oscillating machine. However, the oscillating machine may generate high vibration during operation and the size of the outer diameter of the swing machine is large and it is not easy for an operator to hold for a long time. The oscillating power tool 600 of the present utility model adopts the motor 3 with the outer diameter D in the range of 40 mm to 50 mm to provide power to the oscillating power tool 600. Due to definition to the size of the outer diameter of the motor 3, by reducing the size of the gripping portion in the housing 610, the overall size of the oscillating power tool 600 of the present utility model becomes small, and the oscillating power tool 600 is easily held by an operator. Meanwhile, the oscillating power tool 600 may generate vibration during operation, and with the small overall size, the oscillating power tool 600 can be held by an operator for a long time and is easily used by the operator, thereby ensuring the processing efficiency.

Further, the outer diameter D of the motor 3 is in a range of 46 mm to 48 mm. The outer diameter of the motor 3 is in the range of 46 mm to 48 mm, so that by using the motor 3, it is ensured that the oscillating power tool 600 can have a small housing 610 and can be easily held by an operator while a good power source is provided for the oscillating power tool 600.

Figure 14:
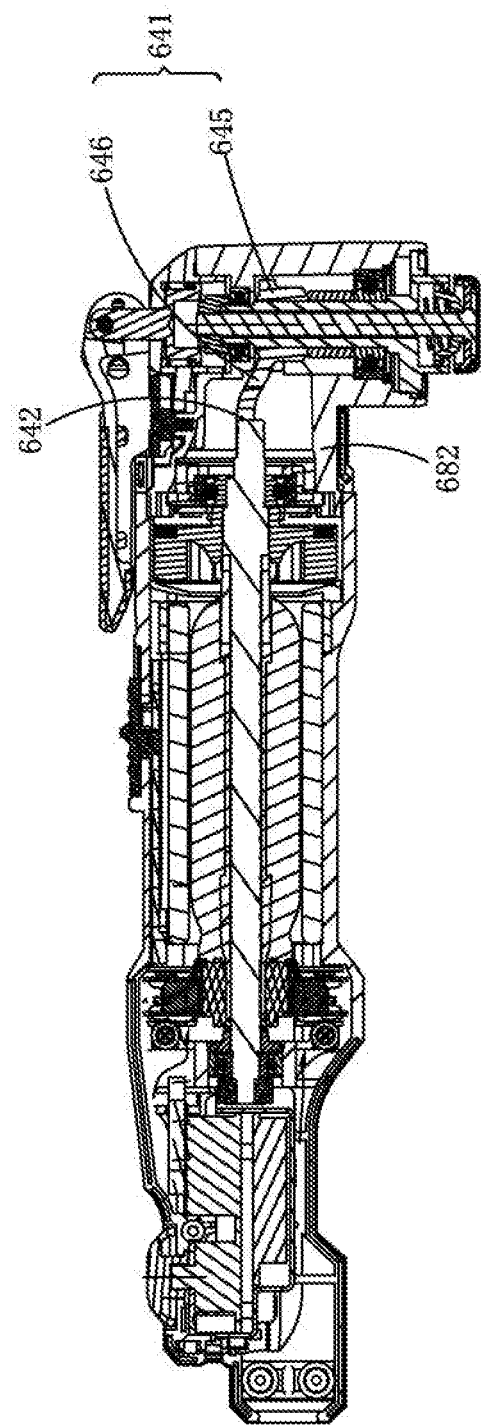
FIG. 14 is a front sectional view of an oscillating power tool according to an example embodiment.
Figure 15:
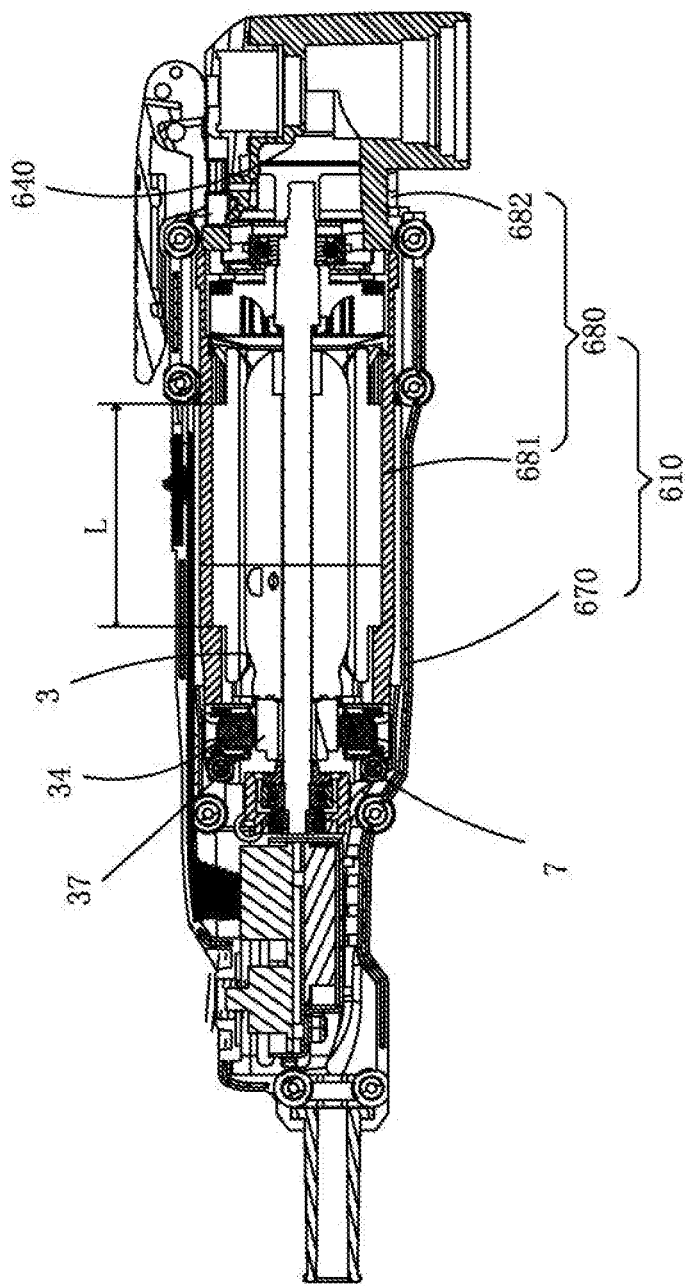
FIG. 15 is a front sectional view of an oscillating power tool according to another example embodiment.

Preferably, in this embodiment, the outer diameter D of the motor 3 is 46 mm. With reference to FIG. 14 and FIG. 15, a ratio of a lamination length L (the length of an effective magnetic path) of the motor to the outer diameter D is greater than 1. The lamination length L of the motor is preferably 50 mm. In this case, the holding size of the housing 610 is further reduced, so that the overall size of the oscillating power tool 600 is appropriate, thereby improving the comfort level during holding. That is, the motor 3 in this embodiment is a 46-motor, to further reduce the overall size of the oscillating power tool 600, so that it is easy for an operator to hold for a long time and the comfort level is improved.

In other embodiments, other sizes may alternatively be selected for the outer diameter of the motor. When the outer diameter D is 42 mm, the ratio of the lamination length L of the motor to the outer diameter D is greater than or equal to 15/14. The lamination length L of the motor is preferably 55 mm. When the outer diameter D is 50 mm, the ratio of the lamination length L of the motor to the outer diameter D is greater than or equal to 9/10. The lamination length L of the motor is preferably 45 mm.

In one of embodiments, the lamination length of the motor 3 is in a range of 45 mm to 75 mm. That is, the length of a stator iron core of the motor 3 is in a range of 45 mm to 74 mm. The overall size of the oscillating power tool 600 is ensured by defining the sizes of the lamination length and the outer diameter of the motor 3, so that the overall size of the oscillating power tool 600 is reduced, and the oscillating power tool 600 is easily held and used by an operator during use. Preferably, in this embodiment, the lamination length of the motor 3 is 60 mm.

In one of embodiments, power of the motor 3 is in a range of 400 W to 450 W, to ensure that the oscillating power tool 600 can operate normally. In addition, a different lamination length of the motor 3 indicates different power of the motor 3, specifically as shown in the following table.

| Power of φ40 mm to φ50 mm motor | |
| --- | --- |
| Lamination length/mm | Power/W |
| 45 | 250-300 |
| 50 | 300-350 |
| 55 | 350-400 |
| 60 | 400-450 |
| 65 | 450-500 |
| 70 | 500-550 |
| 75 | 550~600 |

The oscillating power tool 600 of the present embodiment is powered by using a motor 3 having an outer diameter ranging from 40 mm to 50 mm. Because the outer diameter of the motor 3 is reduced, a size of a portion for gripping on the housing 610 is reduced, so that an overall size of the oscillating power tool 600 of the present embodiment is smaller, to facilitate gripping by operator. At the same times, the oscillating power tool 600 generates vibrations during working. However, because an overall size is relatively small, a comfortable gripping sense is provided, and even if there are vibrations, gripping for a long time does not make an operator uncomfortable.

In a feasible implementation, a limitation to the outer diameter of the motor 3 makes a perimeter of the gripping portion of the housing 610 range from 150 mm to 200 mm, to help operator grip the oscillating power tool 600, so as to further help operation on the oscillating power tool 600, thereby ensuring machining efficiency.

However, usually, reduction of an outer diameter of a motor causes reduction of output power of the motor, it was found by researches in the present embodiment that after the outer diameter of the motor is determined, output power of the motor can be affected by changing the outer diameter of its rotor and a yoke width. Refer to Table 5 to Table 8 for specific analysis.

Table 5 shows variations of a ratio of power to a volume of a motor under conditions of different stator yoke widths 331a (refer to FIG. 4 for a specific structure) and that a ratio of an outer diameter of a rotor to an outer diameter of a stator changes when the diameter of the stator is 46 mm, an axial length of the motor is 50 mm, and a no-load rotation speed of the motor 3 is 30000 rpm (a no-load rotation speed when the motor being mounted in a tool without a speed stabilizer). Values of Table 5 represent that power of the motor fluctuates when the volume of the motor is the same and the no-load rotation speed is the same, and the stator yoke width 331a is increased or the ratio of the outer diameter of the rotor to the outer diameter of the stator is increased. For example, when the ratio of the outer diameter of the rotor to the outer diameter of the stator is kept at 0.62, the ratio of the power to the volume reaches a maximum of 5.54 when the stator yoke width 331a is 3.6 mm. When the stator yoke width 331a is kept at 3.7 mm, the ratio of the power to the volume reaches a maximum of 5.51 when the ratio of the outer diameter of the rotor to the outer diameter of the stator is 0.62. Table 5 shows experimental data when the diameter of the stator is 46 mm, and when the volume of the motor is increased, and other parameters are kept unchanged, the ratio of the power to the volume of the motor is increased.

TABLE 5

Ratio of power to a volume (W/cm³)

| Ratio of an outer diameter of a rotor to an outer diameter of a stator | Stator yoke width (mm) | | | | | | | |
|---|---|---|---|---|---|---|---|---|
| | 3.2 | 3.3 | 3.4 | 3.5 | 3.6 | 3.7 | 3.8 | 4.0 |
| 0.58 | / | / | / | 4.29 | 4.40 | 4.35 | 4.25 | 4.24 |
| 0.59 | / | / | 4.26 | 4.33 | 4.67 | 4.51 | 4.43 | 4.59 |
| 0.62 | / | 3.80 | 4.29 | 4.87 | 5.54 | 5.15 | 4.77 | 4.67 |
| 0.65 | / | 3.26 | 4.35 | 4.51 | 4.83 | 4.73 | 4.62 | 4.45 |

The ratio of the power to the volume of the motor reflects a value of power output efficiency of the motor. Under the same volume, if the ratio is lager, the efficiency of the motor is higher. Motor power in Table 5 is power values of a motor whose no-load rotation speed is 30000 rpm. The ratio of the outer diameter of the rotor to the outer diameter of the stator and the stator yoke width 331a both affect the ratio of the power to the volume of the motor. If the ratio of the outer diameter of the rotor to the outer diameter of the stator is larger, a size of the rotor is larger, and the stator yoke width 331a is correspondingly reduced, and vice versa. If the stator yoke width 331a is larger, a size of the slot of the stator and a size of the rotor are correspondingly reduced, and vice versa. The power of the motor may reach a larger value if the ratio of the outer diameter of the rotor to the outer diameter of the stator and the yoke width are properly designed.

In this embodiment, the ratio of the power to the volume of the motor is selected to be greater than 5 W/cm³. In this way, under the same motor volume, in particular, under the same stator diameter, the handheld oscillating power tool 600 provides a comfortable gripping sense and has higher power.

Referring to Table 5 again, power of the motor 3 fluctuates when the volume of the motor is the same, and the stator yoke width 331a is increased or the ratio of the outer diameter of the rotor to the outer diameter of the stator is increased. In an embodiment, the ratio of the outer diameter of the rotor to the outer diameter of the stator ranges from 0.6 to 0.7, and the outer diameter of the stator is not greater than 50 mm. Preferably, the outer diameter of the stator ranges from 40 mm to 50 mm. In another alternative embodiment, the ratio of the outer diameter of the rotor to the outer diameter of the stator ranges from 0.6 to 0.65, and the yoke width ranges from 3.6 mm to 3.8 mm. If the yoke width is too large, an area of the slot is reduced, resulting in reduction in a quantity of windings of the stator. In such a size range, the power of the motor 3 fluctuates in a range close to a maximum value. Optimally, the outer diameter of the motor is 46 mm, the yoke width is 3.6 mm, and the ratio of the outer diameter of the rotor to the outer diameter of the stator is 0.62.

Table 6 shows a ratio of power of a motor to an outer perimeter of a gripping portion of the oscillating power tool 600 under conditions of different stator yoke widths 331a and that a ratio of an outer diameter of a rotor to an outer diameter of a stator changes when the diameter of the stator is 46 mm, an outer perimeter of the gripping portion is 198 mm, an axial length of the motor is 50 mm, and a no-load rotation speed of the motor 3 is 30000 rpm (a no-load rotation speed when the motor being mounted in a tool without a speed stabilizer). Values of Table 6 represent that power of the motor fluctuates when the volume of the motor is the same, the no-load rotation speed is the same, the outer diameter of the gripping portion is the same, and the stator yoke width 331a is increased or the ratio of the outer diameter of the rotor to the outer diameter of the stator is increased. For example, when the ratio of the outer diameter of the rotor to the outer diameter of the stator is kept at 0.62, the ratio of the power to the outer perimeter reaches a maximum of 2.32 when the stator yoke width 331a is 3.6 mm. When the stator yoke width 331a is kept at 3.7 mm, the ratio of the power to the volume reaches a maximum of 2.16 when the ratio of the outer diameter of the rotor to the outer diameter of the stator is 0.62.

TABLE 6

| Maximum output power (W) Ratio of an outer diameter of a rotor to an outer diameter of a stator | Stator yoke width (mm) | | | | | | | |
|---|---|---|---|---|---|---|---|---|
| | 3.2 | 3.3 | 3.4 | 3.5 | 3.6 | 3.7 | 3.8 | 4.0 |
| 0.58 | / | / | / | 356 | 365 | 361 | 353 | 352 |
| Ratio of power to an outer perimeter | / | / | / | 1.80 | 1.84 | 1.82 | 1.78 | 1.78 |
| 0.59 | / | / | 354 | 360 | 388 | 374 | 368 | 381 |
| Ratio of power to an outer perimeter | / | / | 1.79 | 1.82 | 1.96 | 1.89 | 1.86 | 1.92 |
| 0.62 | / | 316 | 356 | 404 | 460 | 428 | 396 | 388 |
| Ratio of power to an outer perimeter | | 1.59 | 1.80 | 2.04 | 2.32 | 2.16 | 2.00 | 1.96 |
| 0.65 | / | 271 | 361 | 374 | 401 | 392 | 383 | 370 |
| Ratio of power to an outer perimeter | | 1.37 | 1.82 | 1.89 | 2.02 | 1.98 | 1.93 | 1.87 |

The ratio of the power of the motor to the outer perimeter of the gripping portion reflects a value of power output efficiency of the motor. Under the same volume, if the ratio is lager, the efficiency of the motor is higher.

In one of embodiments, output power of the motor 3 to a peripheral perimeter of a gripping portion of the oscillating power tool 600 is greater than 2.0 W/mm. The output power herein is maximum output power output by the oscillating power tool 600 to a working object. The peripheral perimeter of the gripping portion of the oscillating power tool 6001 ranges from 150 mm to 200 mm. To enable an inner side of the gripping portion to have an enough space for accommodating the motor 3, an outer diameter of a stator 40 ranges from 40 mm to 50 mm.

In another alternative embodiment, a peripheral perimeter of a gripping portion of an oscillating power tool 600 is set to range from 165 mm to 200 mm, and an outer diameter of a stator ranges from 46 mm to 48 mm. Output power of a motor 3 to the peripheral perimeter of the gripping portion of the oscillating power tool 600 is greater than 2.1 W/mm.

In another alternative embodiment, a peripheral perimeter of a gripping portion of an oscillating power tool 600 is set to 180 mm, and an outer diameter of a stator is 46 mm. Output power of a motor 3 to the peripheral perimeter of the gripping portion of the oscillating power tool 600 is greater than 2.3 W/mm.

Usually, the foregoing motor 3 cannot be directly applied to the oscillating power tool 600, and usually, a speed stabilizer is added to control an overall no-load speed after the motor is mounted onto the oscillating power tool to be approximately 20000 rpm, so that a corresponding rotation speed of the output shaft 620 is approximately 20000 rpm. How to specifically use the speed stabilize to control the rotation speed of the motor is a common means in the art, and details are not described herein again.

Table 7 shows variations of a ratio of power to a volume of a motor under conditions of different stator yoke widths 331a and that a ratio of an outer diameter of a rotor to an outer diameter of a stator changes when the diameter of the stator is 46 mm, an axial length of the motor is 50 mm, and a no-load rotation speed of the motor 3 is 20000 rpm (a no-load speed when the motor being mounted in a tool without a speed stabilizer). Values of Table 6 represent that power of the motor fluctuates when the volume of the motor is the same, and the stator yoke width 331a is increased or the ratio of the outer diameter of the rotor to the outer diameter of the stator is increased. For example, when the ratio of the outer diameter of the rotor to the outer diameter of the stator is kept at 0.62, the ratio of the power to the volume reaches a maximum of 2.3 when the stator yoke width 331a is 3.6 mm. When the stator yoke width 331a is kept at 3.7 mm, the ratio of the power to the volume reaches a maximum of 2.15 when the ratio of the outer diameter of the rotor to the outer diameter of the stator is 0.62. Table 3 shows experimental data when the diameter of the stator is 46 mm, and when the volume of the motor is increased, and other parameters are kept unchanged, the ratio of the power to the volume of the motor is increased.

Further, with reference to Table 5 above, it can be learned that when the ratio of the outer diameter of the rotor to the outer diameter of the stator is kept at 0.62, the ratio of the power to the volume reaches a maximum when the stator yoke width 331a is 3.6 mm. When the stator yoke width 331a is kept at 3.7 mm, the ratio of the power to the volume reaches a maximum when the ratio of the outer diameter of the rotor to the outer diameter of the stator is 0.62. Therefore, it can be learned that when the outer diameter of the stator is determined, not matter what is the no-load speed of the motor, the power of the motor can reach a maximum when the ratio of the outer diameter of the rotor to the outer diameter of the stator is 0.62, and the yoke width of the stator is 3.6 mm.

TABLE 7

| Ratio of an outer diameter of a rotor to an outer diameter of a stator | Ratio of power to a volume (W/cm³) | | | | | | | |
|---|---|---|---|---|---|---|---|---|
| | Stator yoke width (mm) | | | | | | | |
| | 3.2 | 3.3 | 3.4 | 3.5 | 3.6 | 3.7 | 3.8 | 4 |
| 0.58 | / | / | / | 1.79 | 1.83 | 1.81 | 1.77 | 1.76 |
| 0.59 | / | / | 1.78 | 1.80 | 1.95 | 1.88 | 1.85 | 1.90 |
| 0.62 | / | 1.58 | 1.79 | 2.02 | 2.30 | 2.15 | 2.00 | 1.95 |
| 0.65 | / | 1.36 | 1.81 | 1.88 | 2.01 | 1.97 | 1.93 | 1.85 |

The ratio of the power to the volume of the motor reflects a value of power output efficiency of the motor. Under the same volume, if the ratio is lager, the efficiency of the motor is higher. Motor power in Table 6 is power values of a motor whose no-load rotation speed is 20000 rpm. The ratio of the outer diameter of the rotor to the outer diameter of the stator and the stator yoke width 331a both affect the ratio of the power to the volume of the motor. If the ratio of the outer diameter of the rotor to the outer diameter of the stator is larger, a size of the rotor is larger, and the stator yoke width 331a is correspondingly reduced, and vice versa. If the stator yoke width 331a is larger, a size of the slot of the stator and a size of the rotor are correspondingly reduced, and vice versa. The power of the motor may reach a larger value if the ratio of the outer diameter of the rotor to the outer diameter of the stator and the yoke width are properly designed.

In this embodiment, the ratio of the power to the volume of the motor is selected to be greater than 2. In this way, under the same motor volume, in particular, under the same stator diameter, the handheld oscillating power tool provides a comfortable gripping sense and has higher power.

Referring to Table 7 again, power of the motor fluctuates when the volume of the motor is the same, and the stator yoke width 331a is increased or the ratio of the outer diameter of the rotor to the outer diameter of the stator is increased. In an embodiment, the ratio of the outer diameter of the rotor to the outer diameter of the stator ranges from 0.6 to 0.7, and the outer diameter of the stator is not greater than 50 mm. Preferably, the outer diameter of the stator ranges from 40 mm to 50 mm. In another alternative embodiment, the ratio of the outer diameter of the rotor to the outer diameter of the stator ranges from 0.6 to 0.65, and the yoke width ranges from 3.6 mm to 3.8 mm. If the yoke width is too large, an area of the slot is reduced, resulting in reduction in a quantity of windings of the stator. In such a size range, the power of the motor fluctuates in a range close to a maximum value. In this case, the axial length of motor, that is, the axial length of the stator along the armature shaft, is set to be not less than 40 mm, to range from 45 mm to 60 mm, and preferably, is 55 mm.

Table 8 shows a ratio of power of a motor to an outer perimeter of a gripping portion of the oscillating power tool 600 under conditions of different stator yoke widths 331a and that a ratio of an outer diameter of a rotor to an outer diameter of a stator changes when the diameter of the stator is 46 mm, an outer perimeter of the gripping portion is 198 mm, an axial length of the motor is 50 mm, and a no-load rotation speed of the motor 3 is 20000 rpm (a no-load rotation speed when the motot being mounted in a tool without a speed stabilizer). Values of Table 6 represent that power of the motor fluctuates when the volume of the motor is the same, the no-load rotation speed is the same, the outer diameter of the gripping portion is the same, and the stator yoke width 331a is increased or the ratio of the outer diameter of the rotor to the outer diameter of the stator is increased. For example, when the ratio of the outer diameter of the rotor to the outer diameter of the stator is kept at 0.62, the ratio of the power to the outer perimeter reaches a maximum of 0.81 when the stator yoke width 331a is 3.6 mm. When the stator yoke width 331a is kept at 3.7 mm, the ratio of the power to the volume reaches a maximum of 0.79 when the ratio of the outer diameter of the rotor to the outer diameter of the stator is 0.62.

TABLE 8

| Maximum output power (W) Ratio of an outer diameter of a rotor to an outer diameter of a stator | Stator yoke width (mm) | | | | | | | |
|---|---|---|---|---|---|---|---|---|
| | 3.2 | 3.3 | 3.4 | 3.5 | 3.6 | 3.7 | 3.8 | 4 |
| 0.58 | / | / | / | 148 | 151 | 150 | 147 | 146 |
| Ratio of power to an outer perimeter | / | / | / | 0.75 | 0.76 | 0.76 | 0.74 | 0.74 |
| 0.59 | / | / | 147 | 149 | 161 | 156 | 153 | 157 |
| Ratio of power to an outer perimeter | / | / | 0.74 | 0.75 | 0.81 | 0.79 | 0.77 | 0.79 |
| 0.62 | / | 131 | 148 | 167 | 190 | 178 | 166 | 161 |
| Ratio of power to an outer perimeter | / | 0.66 | 0.75 | 0.84 | 0.96 | 0.90 | 0.84 | 0.81 |
| 0.65 | / | 112 | 150 | 156 | 166 | 163 | 160 | 153 |
| Ratio of power to an outer perimeter | / | 0.57 | 0.76 | 0.79 | 0.84 | 0.82 | 0.81 | 0.77 |

The ratio of the power of the motor to the outer perimeter of the gripping portion reflects a value of power output efficiency of the motor. Under the same volume, if the ratio is lager, the efficiency of the motor is higher.

In one of embodiments, output power of the motor 3 to a peripheral perimeter of a gripping portion of the oscillating power tool 600 is greater than 0.8 W/mm. The output power herein is maximum output power output by the oscillating power tool 600 to a working object. The peripheral perimeter of the gripping portion of the oscillating power tool 600 ranges from 150 mm to 200 mm. To enable an inner side of the gripping portion to have an enough space for accommodating the motor 3, an outer diameter of a stator 40 ranges from 40 mm to 50 mm.

In another alternative embodiment, a peripheral perimeter of a gripping portion of an oscillating power tool 600 is set to range from 165 mm to 200 mm, and an outer diameter of a stator 46 ranges from 46 mm to 48 mm. Output power of a motor 3 to the peripheral perimeter of the gripping portion of the oscillating power tool 600 is greater than 0.85 W/mm.

In another alternative embodiment, a peripheral perimeter of a gripping portion of an oscillating power tool 600 is set to 180 mm, and an outer diameter of a stator 121 is 46 mm. Output power of a motor 3 to the peripheral perimeter of the gripping portion of the oscillating power tool 600 is greater than 0.95 W/mm.

The no-load rotation speed of the foregoing motor is 20000 rpm. Therefore, the motor can be directly applied to the oscillating power tool, so that the rotation speed of the output shaft can satisfy requirements without performing speed stabilization or making another improvement.

An increase of the power of the motor causes the motor to generate more heat during working, reduction of the diameter of the gripping portion leads to reduction of an area of a heat dissipation air duct, and after the laminate stack is elongated, its heat dissipation air duct is also elongated. The foregoing factors cause a rise in the temperature of the motor. Therefore, it is necessary to optimize air duct design and improve heat dissipation efficiency of the motor.

Specifically, a quantity of air outlets can be increased. An additional group of air outlets are arranged at the bottom of the housing, so that there are three groups of air outlets, and an outlet amount of hot air is increased, thereby improving heat dissipation efficiency of the motor.

Certainly, a quantity of air inlets can be increased. An additional group of air inlets are disposed at the bottom of the housing, so that there are three groups of air inlets, and an inlet amount of cold air is increased, thereby improving heat dissipation efficiency of the motor.

In one of embodiments, the housing 610 includes an outer housing 670 and an inner housing 680. The outer housing 670 is sleeved on the inner housing 680. In addition, the motor 3, the transmission mechanism, and the output shaft are all received in the inner housing 680. The motor 3 is installed in the inner housing 680 and is connected to the transmission mechanism in the inner housing 680. The oscillating power tool 600 of the present utility model may have a single-layer housing or a dual-layer housing. When the oscillating power tool 600 has a single-layer housing, the single-layer housing is the inner housing 680, and an operator directly holds a surface of the inner housing 680 during use. When the oscillating power tool 600 has a dual-layer housing, the dual-layer housing includes an outer housing 670 and an inner housing 680, the outer housing 670 is sleeved on the outside of the inner housing 680, and an operator directly holds a surface of the outer housing 670 during use.

Further, the inner housing 680 includes a motor housing 681 and a head housing 682. Both the motor housing 681 and head housing 682 may alternatively be received in the outer housing 670. The motor 3 is received in the motor housing 681, and the output shaft and the transmission mechanism are received in the head housing 682 and extend out of the head housing 682, for ease of installation of the working head. In this embodiment, the motor housing 681 is received in the outer housing 670, and the outer housing 670 partially wraps the head housing 682. That is, the outer housing 670 covers the motor housing 681 and part of the head housing 682.

In addition, the oscillating power tool 600 further includes a vibration-damping element 7, and the vibration-damping element 7 is installed between the inner housing 680 and the outer housing 670. Specifically, the vibration-damping element 7 may be merely disposed between the motor housing 681 and the outer housing 670, or may be merely disposed between the head housing 682 and the outer housing 670. Certainly, the vibration-damping element 7 may alternatively be disposed between the motor housing 681 and the outer housing 670 and between the head housing 682 and the outer housing 670. In this embodiment, the vibration-damping element 7 is disposed between the motor housing 681 and the outer housing 670 and between the head housing 682 and the outer housing 670. For ease of description, an example in which the vibration-damping element 7 is disposed between the outer housing 670 and the inner housing 680 is used for description in this embodiment.

In this way, there are two paths for transmitting the vibration generated by the head housing 682. One path is that the vibration of the head housing 682 is transmitted to the outer housing 670 through the inner housing 680, and the other path is that the vibration is directly transmitted by the head housing 682 to the outer housing 670. By transmitting the vibration through the two paths together, it can be ensured that each path transmits part of the vibration, and the vibration attenuates during the transmission process, so that vibration applied to the outer housing 670 is greatly reduced. Therefore, a force applied to hands of an operator is reduced, influences such as impact on arms of the operator and hand numb caused by the oscillating power tool 600 are allevi-ated, the comfort level during operation is improved, and it is easy for the operator to hold and use the oscillating power tool 600 for a long time.

The vibration-damping element 7 has a vibration-damping function. When vibration passes through the vibration-damping element 7, the vibration-damping element 7 can greatly reduce the vibration transmitted by the vibration-damping element 7 by using a vibration-damping property of the vibration-damping element 7. The vibration-damping element 7 is disposed between the inner housing 680 and the outer housing 670, and the vibration-damping element 7 can support the outer housing 670, so that an inner surface of the outer housing 670 is not in contact with an outer surface of the inner housing 680. That is, the inner housing 680 is not in contact with the outer housing 670 directly, and a connection relationship between the inner housing 680 and the outer housing 670 is established through the vibration-damping element 7, so that vibration on the inner housing 680 can be transmitted to the outer housing 670 through the vibration-damping element 7 only, and the vibration can attenuate greatly when being transmitted through the vibration-damping element 7, and further the vibration transmitted by the vibration-damping element 7 to the outer housing 670 is greatly reduced. Therefore, the force applied to the hands of the operator is reduced, influences such as impact on arms of the operator and hand numb caused by the oscillating power tool 600 are alleviated, the comfort level during operation is improved, and it is easy for the operator to hold and use the oscillating power tool 600 for a long time.

When the size of the outer diameter of the motor 3 is in the range of 40 mm to 50 mm, the motor 3 is received in the motor housing 681. The outer housing 670 covers the motor housing 681 and part of the head housing 682, the size of the motor housing 681 can be reduced, further, the size of the outer housing 670 can be reduced and the size of the gripping portion can be reduced, so that it is easy for an operator to hold the gripping portion and the comfort level during holding is improved. Compared with a current oscillating machine, in the present utility model, the outer diameter of the motor 3 is reduced and the sizes of the motor housing 681 and the outer housing 670 covering the motor 3 are correspondingly decreased, so that the operator can hold the outer housing 670 more conveniently during use of the oscillating power tool 600, and the comfort level during holding is improved. Meanwhile, after combination with the vibration-damping element 7, in the oscillating power tool 600 of the present utility model, the dual effects of vibration-damping and ease of holding are both considered and the comfort of holding and the vibration-damping performance are both considered, so that it is easy for the operator to hold the oscillating power tool 600 for a long time.

At present, an operator needs to hold the oscillating machine when using the oscillating machine. However, the oscillating machine may generate large vibration during operation, the vibration of the oscillating machine is large, the feel of vibration is strong, and it is not easy for the operator to hold the oscillating machine for a long time. The outer housing 670 of the oscillating power tool 600 of the present utility model covers the outside of the inner housing 680, and the vibration-damping element 7 is installed between the outer housing 670 and the inner housing 680. The oscillating power tool 600 may generate vibration during operation and the vibration is mainly generated by the head housing 682. The head housing 682 transmits the vibration to the inner housing 680, and the inner housing 680 also vibrates. The inner housing 680 is connected to the outer housing 670 through the vibration-damping element 7, and the vibration-damping element 7 can greatly reduce the vibration transmitted to the outer housing 670 through the vibration-damping element 7 by using the vibration damping property of the vibration-damping element 7, so that a force applied to hands of an operator is reduced, influences such as impact on arms of the operator and hand numb caused by the oscillating power tool 600 are alleviated, the comfort level during operation is improved, and it is easy for the operator to hold and use the oscillating power tool 600 for a long time.

In one of embodiments, there is a preset gap between the outer housing 670 and the inner housing 680, and the vibration-damping element 7 is installed in the preset gap. In this way, it can be ensured that an inner surface of the outer housing 670 is not in contact with an outer surface of the inner housing 680 directly, thereby preventing vibration of the inner housing 680 from being directly transmitted to the outer housing 670. By transmitting vibration through the vibration-damping element 7, a vibration transmission path can be increased, and part of vibration can attenuate by using the vibration damping property of the vibration-damping element 7, so that the vibration transmitted by the vibration-damping element 7 is reduced. The vibration-damping element 7 is disposed in the preset gap. In this way, the oscillating power tool 600 is easily assembled and used while it is ensured that the vibration-damping element 7 reduces the vibration applied to the outer housing 670.

Further, the preset gap is in a range of 2 mm to 3 mm. When the preset gap is in the range of 2 mm to 3 mm, it can be ensured that the inner surface of the outer housing 670 is not in contact with the outer surface of the inner housing 680 directly, thereby preventing the vibration of the inner housing 680 from being directly transmitted to the outer housing 670. Meanwhile, it can further be ensured that the size of the outer housing 670 is not excessively large, and is easily held by an operator, thereby saving strength of the operator and improving the comfort level during holding. A peripheral perimeter of the gripping portion ranges from 165 mm to 215 mm when the housing 610 includes an outer housing 670 and an inner housing 680.

In one of embodiments, the length of the outer housing 670 is greater than the length of the motor housing 681, and the outer housing 670 covers the motor housing 681 and part of the head housing 682.

In one of embodiments, there are at least two vibration-damping elements 130, and the at least two vibration-damping elements 130 are respectively disposed on the head housing 682 and an outer surface of one end the motor housing 681 far away from the head housing 682. That is, the at least two vibration-damping elements 130 are respectively disposed on the head housing 682 and the motor housing 681, the head housing 682 is in contact with the outer housing 670 through the vibration-damping elements 130, the motor housing 681 is in contact with the outer housing 670 through the vibration-damping elements 130, the inner surface of the outer housing 670 is not in contact with the outer surface of the motor housing 681 directly, and the outer surface of the head housing 682 is not in contact with the inner surface of the outer housing 670 directly. In this way, vibration is prevented from being directly transmitted to the outer housing 670, the vibration applied to the outer housing 670 is reduced, influences such as impact on arms of the operator and hand numb caused by the oscillating power tool 600 are alleviated, the comfort level during operation is improved, and it is easy for the operator to hold and use the oscillating power tool 600 for a long time.

In one of embodiments, the vibration-damping element 7 is a vibration-damping block, a vibration-damping pat, a vibration-damping ring, or the like. Vibration received by the outer housing 670 is reduced by using the vibration-damping element 7, which is a vibration-damping block, a vibration-damping pat, a vibration-damping ring, or the like. When the vibration-damping element 7 is a vibration-damping block or a vibration-damping pat, there may be at least four vibration-damping elements 130. The at least four vibration-damping elements 130 are respectively disposed on the head housing 682 and one end of the motor housing 681 far away from the head housing 682. When the vibration-damping element 7 is a vibration-damping ring, there may be at least two vibration-damping elements 130. The at least two vibration-damping elements 130 are respectively sleeved on the head housing 682 and one end of the motor housing 681 far away from the head housing 682.

The vibration-damping elements 130 may be made of an elastic material, and vibration received by the outer housing 670 is reduced by using the elastic function of the elastic material, thereby greatly alleviating influences such as impact and hand numb on hands of an operator. Specifically, the vibration-damping element 7 is made of a material having elasticity such as rubber, nylon, or plastic, to ensure that the vibration-damping element 7 has a buffering function and can transform the vibration applied to the vibration-damping element 7. Certainly, the vibration-damping element 7 may alternatively be a corrugated pipe. The corrugated pipe has a foldable wrinkle piece, so that the corrugated pipe can be compressed in a folding telescopic direction. The vibration applied to the vibration-damping element 7 is transformed through folding of the foldable wrinkle piece, to reduce the vibration applied to the outer housing 670, thereby greatly alleviating influences such as impact and hand numb on hands of an operator.

In one of embodiments, the vibration-damping elements 130 are oppositely disposed on the head housing 682 and the motor housing 681. An inner wall of the outer housing 670 is provided with a protrusion part, and the protrusion part is installed between the oppositely disposed vibration-damping elements 130. The protrusion part extends out of the inner surface of the outer housing 670, and installation of the outer housing 670 is implemented through contact between the protrusion part and the vibration-damping elements 130, to support the outer housing 670, so that the inner surface of the outer housing 670 is not in contact with the outer surface of the motor housing 681 or the outer surface of the head housing 682 directly. Meanwhile, the vibration-damping elements 130 first transmit the vibration to the protrusion part and then the protrusion part transmits the vibration to the outer housing 670. In this way, a vibration transmission path can be increased, to further reduce the vibration applied to the outer housing 670.

Further, the protrusion part is in interference fit with the oppositely disposed vibration-damping elements 130. That is, the oppositely disposed vibration-damping elements 130 are in tight fit with the protrusion part, and the protrusion part is fixed by the oppositely disposed vibration-damping elements 130, so that the position of the protrusion part does not shift in the process in which vibration is applied to the protrusion part, and the position of the outer housing 670 is fixed and does not shift. In this way, when an operator uses the oscillating power tool 600, oscillating motion can be implemented by holding the outer housing 670, thereby ensuring the operating precision and easy use.

In one of embodiments, the outer housing 670 includes a first housing and a second housing, and the first housing and the second housing are engaged with each other to form the outer housing 670. A fastener is disposed on the first housing or the second housing, and the first housing and the second housing are fixed through the fastener. In this way, the outer housing 670 is easily assembled and disassembled, and is easily used by an operator. Meanwhile, the fastener can ensure reliable fastening between the first housing and the second housing, so that loose does not appear in the operating process to affect use.

Technical features of the foregoing embodiments may be randomly combined. To make description concise, not all possible combinations of the technical features in the foregoing embodiments are described. However, as long as combinations of these technical features do not contradict each other, it should be considered that the combinations all fall within the scope recorded by this specification.

The above embodiments only express several implementations of the present embodiment, which are described specifically and in detail, and therefore cannot be construed as a limitation to the patent scope of the present embodiment. It should be pointed out that for several deformations and improvements that may also be made by a person of ordinary skill in the art without departing from the idea of the present embodiment all fall within the protection scope of the present embodiment. Therefore, the protection scope of the present embodiment patent shall be subject to the appended claims.

What is claimed is:

1. An oscillating power tool, comprising:
a housing;
an output shaft for installing a working head, the output shaft being installed in the housing and extending out of the housing;
a transmission mechanism being configured to be installed in the housing and to be connected to the output shaft; and
a motor being installed in the housing, and the motor comprising: a stator; a rotor, rotatable relative to the stator; and an armature shaft being fixedly connected to the rotor, and wherein the armature shaft is connected to the transmission mechanism, and the transmission mechanism converts rotation of the armature shaft into reciprocation of the output shaft around an axis per se, wherein a no-load rotation speed of the motor is greater than 20000 revolutions/minute, and a ratio of output power of the motor to a volume of the motor is greater than 2 W/cm$^3$.

2. The oscillating power tool according to claim 1, wherein an outer diameter of the motor is in a range of 40 mm to 50 mm.

3. The oscillating power tool according to claim 2, wherein the housing is provided with a gripping portion, and a peripheral perimeter of the gripping portion ranges from 150 mm to 200 mm.

4. The oscillating power tool according to claim 3, wherein a ratio of the output power of the motor to the peripheral perimeter of the gripping portion is greater than 0.95 W/mm.

5. The oscillating power tool according to claim 1, wherein the no-load rotation speed of the motor is greater than 30000 revolutions/minute, and the ratio of the output power of the motor to the volume is greater than 5 W/cm3.

6. The oscillating power tool according to claim 5, wherein the housing is provided with a gripping portion, a peripheral perimeter of the grip portion ranges from 150 mm to 200 mm, and a ratio of the output power of the motor to the peripheral perimeter of the gripping portion are greater than 2.0 W/mm.

7. The oscillating power tool according to claim 1, wherein a ratio of an outer diameter of the rotor to an outer diameter of the stator ranges from 0.60 to 0.70, and a yoke width of the stator ranges from 3.5 mm to 4.0 mm.

8. The oscillating power tool according to claim 1, wherein an axial length of the motor ranges from 45 mm to 60 mm.

9. The oscillating power tool according to claim 1, wherein the housing comprises an outer housing and an inner housing;
the outer housing covers the outside of the inner housing;
the motor, the transmission mechanism, and the output shaft are all received in the inner housing;
wherein the outer housing is provided with a gripping portion, and a peripheral perimeter of the gripping portion ranges from 165 mm to 215 mm;
wherein the inner housing comprises a motor housing and a head housing; and
the output shaft and the transmission mechanism are received in the head housing and the motor is received in the motor housing.

10. The oscillating power tool according to claim 9, wherein it further comprises a vibration-damping element, and wherein
the vibration-damping element is disposed between the head housing and the outer housing;
or the vibration-damping element is disposed between the motor housing and the outer housing;
and the vibration-damping element is a vibration-damping block, a vibration-damping pat, or a vibration-damping ring.

11. An oscillating power tool, comprising:
a housing;
an output shaft for installing a working head, the output shaft being installed in the housing and extending out of the housing;
a transmission mechanism being configured to be installed in the housing and to be connected to the output shaft; and
a motor being installed in the housing, and the motor comprising: a stator; a rotor, rotatable relative to the stator; and an armature shaft being fixedly connected to the rotor, and the armature shaft is connected to the transmission mechanism, and the transmission mechanism converts rotation of the armature shaft into reciprocation of the output shaft around an axis per se, a no-load rotation speed of the motor is greater than 38000 revolutions/minute, and a ratio of output power of the motor to a volume of the motor is greater than 8.5 W/cm3.

12. The oscillating power tool according to claim 11, wherein an outer diameter of the motor is in a range of 40 mm to 50 mm.

13. The oscillating power tool according to claim 12, wherein the housing is provided with a gripping portion, and a peripheral perimeter of the gripping portion ranges from 150 mm to 185 mm, a ratio of the output power of the motor to the peripheral perimeter of the gripping portion is greater than 5 W/mm.

14. The oscillating power tool according to claim 11, wherein an axial length of the motor ranges from 45 mm to 60 mm, a ratio of an outer diameter of the rotor to an outer diameter of the stator ranges from 0.60 to 0.70, and a yoke width of the stator ranges from 3.6 mm to 4.2 mm.

15. The oscillating power tool according to claim 11, wherein the housing comprises an outer housing and an inner housing;

the outer housing covers the outside of the inner housing;
the motor, the transmission mechanism, and the output shaft are all received in the inner housing;
the outer housing is provided with a gripping portion, and a peripheral perimeter of the gripping portion ranges from 165 mm to 215 mm;
the inner housing comprises a motor housing and a head housing; and
the output shaft and the transmission mechanism are received in the head housing and the motor is received in the motor housing.

* * * * *